(12) United States Patent
Bowden

(10) Patent No.: US 12,196,278 B2
(45) Date of Patent: Jan. 14, 2025

(54) BRAKE SYSTEMS HAVING BACK PLATES WITH PROJECTING INSERTS

(71) Applicant: Westinghouse Air Brake Technologies Corporation, Pittsburgh, PA (US)

(72) Inventor: A. Gary Bowden, Laurinburg, NC (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 568 days.

(21) Appl. No.: 17/508,052

(22) Filed: Oct. 22, 2021

(65) Prior Publication Data

US 2022/0299078 A1   Sep. 22, 2022

Related U.S. Application Data

(60) Provisional application No. 63/163,543, filed on Mar. 19, 2021.

(51) Int. Cl.
*F16D 65/092* (2006.01)
(52) U.S. Cl.
CPC .... *F16D 65/092* (2013.01); *F16D 2250/0084* (2013.01)
(58) Field of Classification Search
CPC ................. F16D 65/092; F16D 65/062; F16D 2250/0084; F16D 65/0037
See application file for complete search history.

(56) References Cited

U.S. PATENT DOCUMENTS

| | | |
|---|---|---|
| 1,574,555 A | 2/1926 | Connelly |
| 4,276,968 A | 7/1981 | Cripe et al. |
| D597,907 S | 8/2009 | Liu et al. |
| D604,215 S | 11/2009 | Liu et al. |
| D614,551 S | 4/2010 | Liu et al. |
| D669,828 S | 10/2012 | Liu et al. |
| D712,809 S | 9/2014 | Kloos |
| D784,874 S | 4/2017 | Buxton et al. |
| 2003/0205438 A1 | 11/2003 | Hartsock |
| 2003/0234142 A1 | 12/2003 | Shute et al. |

(Continued)

FOREIGN PATENT DOCUMENTS

| | | |
|---|---|---|
| CN | 1286189 A | 3/2001 |
| CN | 202040250 U | 11/2011 |
| CN | 304918834 | 11/2018 |

(Continued)

OTHER PUBLICATIONS

EA document No. EA 042854 published on Mar. 29, 2023.*

(Continued)

*Primary Examiner* — Pamela Rodriguez
(74) *Attorney, Agent, or Firm* — K&L Gates LLP

(57) ABSTRACT

A vehicle brake system includes a back plate that may support a composite pad, and at least one conditioning insert coupled to the back plate and that may contact a surface of a wheel during a braking event and thereby to condition at least a portion of the surface of the wheel. Optionally, the back plate can define a U-shaped coupler that is centrally located and has two ends that are distal from the coupler. The back plate can have a centerline extending from a first end of the ends to a second end of the ends while passing through a center of the back plate, and the at least one conditioning insert can be disposed off of the centerline so as to not be centrally disposed.

17 Claims, 36 Drawing Sheets

(56) References Cited

U.S. PATENT DOCUMENTS

2003/0234143 A1    12/2003   Shute et al.
2007/0227839 A1    10/2007   Barrett et al.

FOREIGN PATENT DOCUMENTS

| | | | | |
|---|---|---|---|---|
| CN | 306921358 | | 11/2021 | |
| CN | 307500038 | | 8/2022 | |
| EA | 200900673 | A1 | 2/2010 | |
| EA | 016162 | B1 | 4/2011 | |
| EA | 016180 | B1 | 2/2012 | |
| EA | 029533 | B1 | 7/2016 | |
| EP | 1074755 | A1 * | 2/2001 | ......... F16D 65/0037 |
| EP | 1079134 | A1 * | 2/2001 | ........... F16D 65/062 |
| JP | 2012-189175 | A | 10/2012 | |
| RU | 2413643 | C1 | 3/2011 | |
| RU | 143256 | U1 | 7/2014 | |
| RU | 157868 | U1 | 12/2015 | |
| RU | 158605 | U1 | 1/2016 | |
| RU | 2601768 | C1 | 11/2016 | |
| RU | 173155 | U1 | 8/2017 | |
| RU | 173547 | U1 | 8/2017 | |
| RU | 174773 | U1 | 11/2017 | |
| RU | 175071 | U1 | 11/2017 | |
| WO | 2020/252125 | A1 | 12/2020 | |
| WO | 2020252109 | A1 | 12/2020 | |
| WO | 2020252120 | A1 | 12/2020 | |

OTHER PUBLICATIONS

Customized Composite brake shoes, composite stamping steel railway wagon parts train brake shoes, available in GlobalSources.com, announced Year 2022 [online], [site visited Dec. 28, 2022], Internet URL: https://www.globalsources.com/ Brake-shoes/Railway-wagon-composite-brake-shoes-1188679109p.htm.

Heavy braking and sparks with cast iron brake blacks, announced in Youtube on Dec. 21, 2017 [online], [site visited Dec. 28, 2022], Available from the internet URL: https://www.youtube.com/watch?v=jm4LXmumR9s.

Locomotive maintenance—brake shoe change, announced in Youtube on Mar. 26, 2013 [online], [site visited Dec. 28, 2022], Available from the internet URL: https://www.youtube.com/watch?v=KCfDwWcfQMw.

Extended European Search Report mailed Feb. 10, 2022 for corresponding European Application No. 21191739.8 (8 Pages).

Search Report dated Dec. 13, 2021 for corresponding Eurasian Application No. 202191873 (2 pages).

English translation of the Search Report dated Dec. 13, 2021 for corresponding Eurasian Application No. 202191873 (2 pages).

Disk Brake Pads and Brake Block Design and Materials for Railways, Federal-Mogul Corporation, https://www.railway-technology.com/contractors/brakes/federalmogul/. Nov. 19, 2020. 6 Pages.

M. Günay et al. "An Investigation on braking systems used in railway vehicles, "/ Engineering Science and Technology, an International Journal 23 (2020) 421-431.

Hindustan Composites Limited, Railway Brake Blocks, https://www.hindcompo.com/products/railway-brake-blocks.htm Nov. 19, 2020. 2 Pages.

Wabtec Corporation, V626—14 "Day One" Treadguard® Locomotive Brakeshoe, 4 Pages date unknown,.

Office Action mailed Jun. 16, 2023 for corresponding Eurasian Patent Application No. 202293414. English translation provided. (7 pages).

Search report mailed May 5, 2023 for corresponding Eurasian Patent application 202293414. English translation provided (5 pages).

Fras-le Launches New Railway Shoe, available in TheBrakeReport.com, announced Year 2019 [online], [site visited Sep. 19, 2023], 1 nternet URL: https ://thebrakereport.com/fras-le-launches-new-railway-shoe/.

Office Action mailed May 12, 2022 for corresponding Eurasian Patent Application No. 202191873. English translation provided. (8 pages).

* cited by examiner

US 12,196,278 B2

BRAKE SYSTEMS HAVING BACK PLATES WITH PROJECTING INSERTS

CROSS-REFERENCE TO RELATED APPLICATIONS

This application claims priority to U.S. Provisional Application No. 63/163,543, which was filed 19 Mar. 2021, and the entire disclosure of which is incorporated by reference herein.

BACKGROUND

Technical Field

The subject matter described herein relates to brake systems that brake wheels of a vehicle while also conditioning surfaces of the wheels.

Discussion of Art

Some brake systems can condition surfaces of wheels while also slowing or stopping rotation of the wheels. These brake systems include brake pads that move toward surfaces of the wheels to generate friction and slow or stop rotation of the wheels. Rigid bodies in the brake pads can concurrently condition the wheel surfaces by removing protrusions, debris, etc. from surfaces of the wheels. But, some currently known brake systems have rigid bodies that can exert too much stress on the brake pads during operation and have other shortcomings as set forth herein.

BRIEF DESCRIPTION

In one example, a vehicle brake system includes a back plate that may support a composite pad, and at least one conditioning insert coupled to the back plate and that may contact a surface of a wheel during a braking event and thereby to condition at least a portion of the surface of the wheel.

In one example, a vehicle brake system includes a back plate that may support a composite pad. The back plate is elongated from a first end to a second end. The brake system also includes conditioning inserts coupled to the back plate proximate to the first and second ends of the back plate. The conditioning inserts may contact a surface of a wheel during a braking event and thereby to condition at least a portion of the surface of the wheel.

In one example, a method includes obtaining a back plate that may support a composite pad, and forming at least one conditioning insert coupled to the back plate and positioned to contact a surface of a wheel during a braking event and thereby to condition at least a portion of the surface of the wheel. The back plate can be formed to have a U-shaped coupler that is centrally located and two ends that are distal from the coupler, and the at least one conditioning insert can be formed proximate to one of the two ends of the back plate.

In one example, a vehicle brake system includes a back plate that may support a composite pad, and at least one conditioning insert coupled to the back plate and that may contact a surface of a wheel during a braking event and thereby to condition at least a portion of the surface of the wheel.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
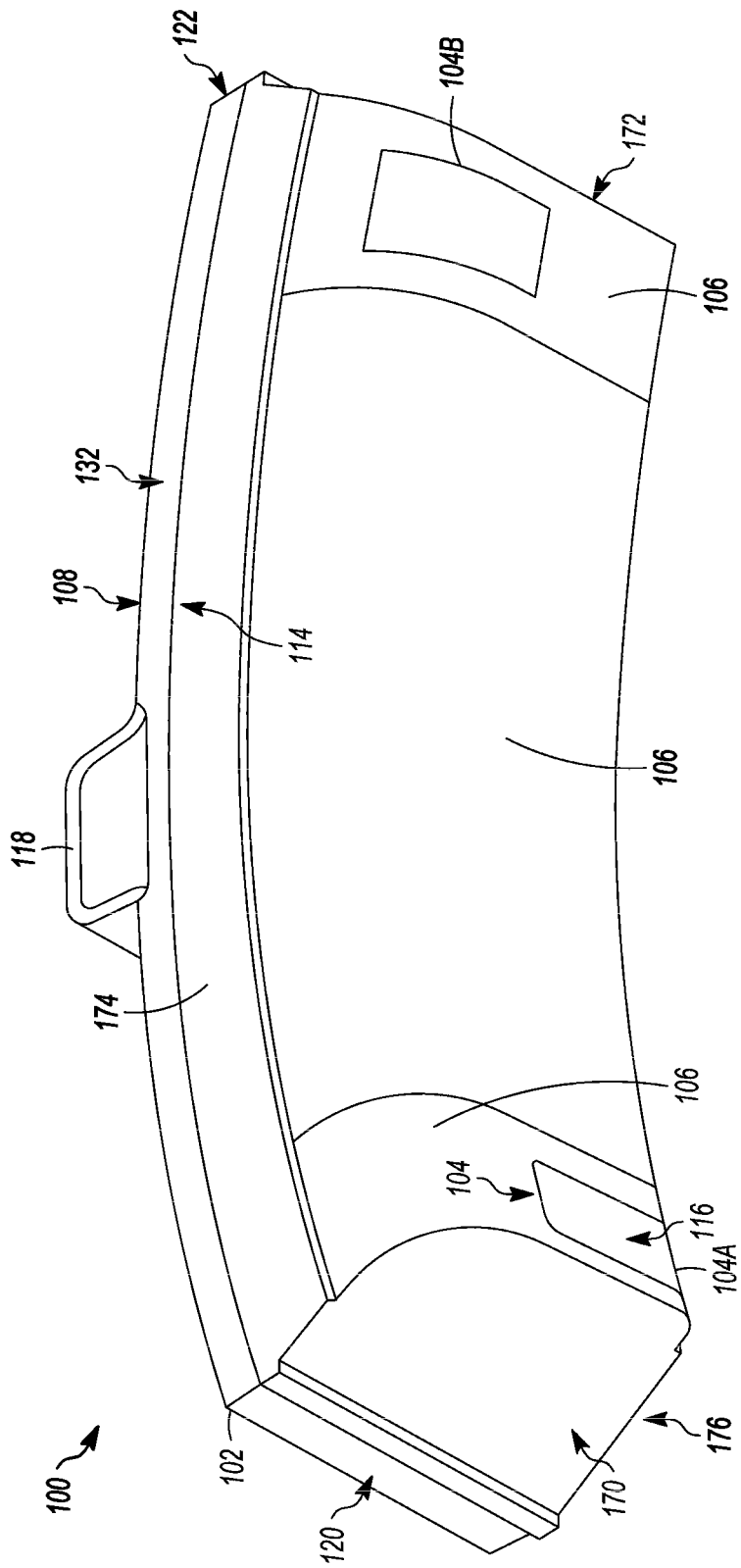
FIG. 1 illustrates a perspective view of a brake system.

Embodiments of the subject matter described herein relate to vehicle brake systems having back plates with inserts projecting from the plates. Brake pads are formed around the inserts and coupled with the back plates and inserts. During braking, the brake systems move toward the surface of a wheel (e.g., the outer circumferential surface) to cause the brake pads to engage the wheel surface and slow or stop rotational movement of the wheel. The inserts projecting from the back plates can be rigid bodies that contact the surface of the wheel to condition the wheel, such as by removing debris or otherwise contact cleaning the wheel surface. The back plates optionally can be referred to as backing plates.

A variety of inserts are shown and described herein. In contrast to the inserts of some known brake systems, various embodiments of the back plates and inserts described and shown herein provide for multiple inserts, inserts disposed closer to opposite ends of the back plates (than the middle of the back plates), and/or inserts that are offset from each other to provide increased coverage over the wheel surface. The inserts can be positioned on the back plates so that the inserts form the leading and/or trailing edges of the brake pads. This can protect the brake pads from debris that would otherwise strike the leading or trailing edges of the brake pads during rotation of the wheels as the inserts can be formed from more rigid and/or durable materials than the brake pads.

Additionally, embodiments of the inventive subject matter include inserts in brake pads having smaller surface area ratios (the insert surface area that contacts the wheel surface divided by the surface area of the pad that contacts the wheel surface) than some known brake pads. Embodiments described herein also include inserts having tapered shapes that cause the surface areas of the inserts that face and contact the wheel surface to increase over time as the inserts are worn down. Profiles of outer surfaces of the inserts can be shaped to mechanically lock the brake pads to the inserts (with or without chemical bonding between the inserts and the brake pads).

The inserts can be mechanically coupled to the back plates (e.g., through a press-fit, friction fit, or the like), or may be welded (or otherwise adhered) to the back plates. Optionally, the inserts can be integrally formed with the back plates such that there are no seams, couplings, or the like between the inserts and the back plates. The inserts can be formed from a metal such as iron, an iron alloy, cast iron, ductile cast iron, malleable cast iron, gray cast iron, white cast iron, sintered metal, a sintered metal alloy, one or more steels (e.g., carbon steel, cast steel, etc.), another metal or metal alloy, a composite material, or the like. The thermal management features, inserts, and/or back plates can be cast, extruded, additively manufactured, or the like. These and other features, aspects, and variations on embodiments of the inventive brake systems are shown and described herein.

Figure 2:
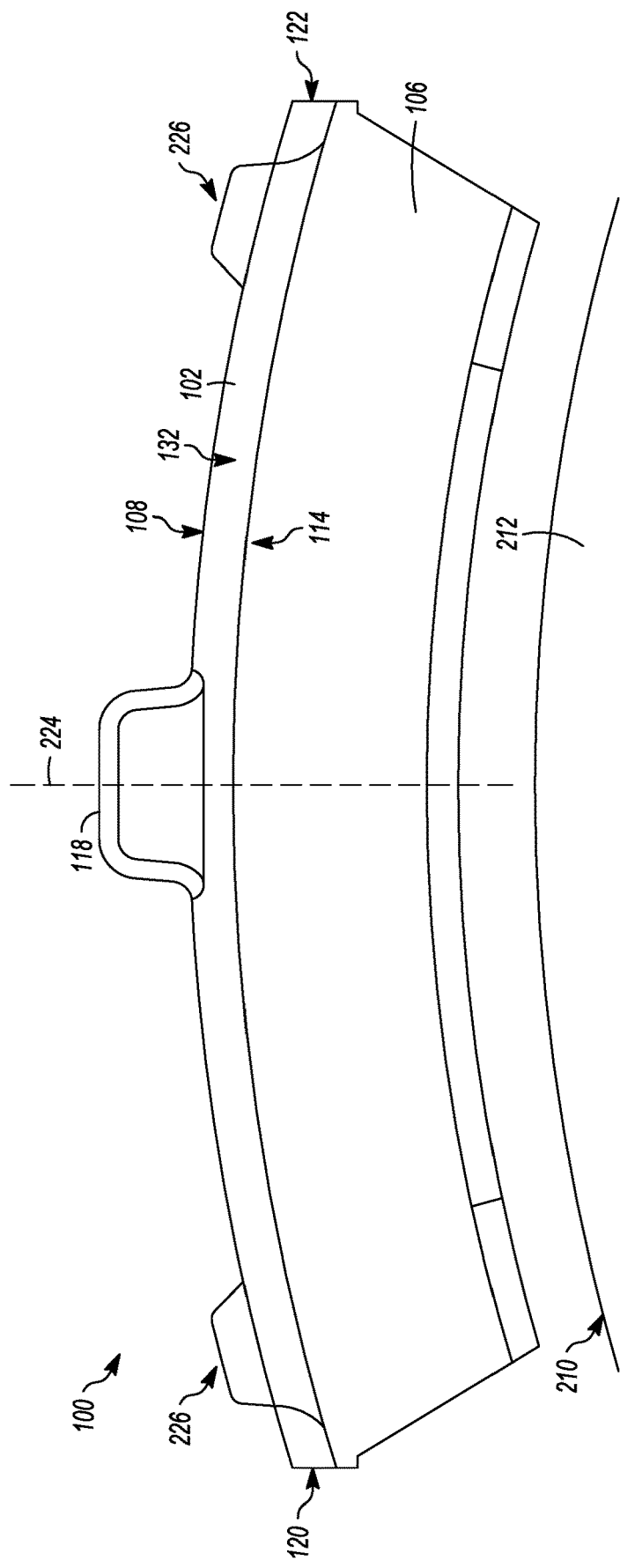
FIG. 2 illustrates a side elevational view of the brake system shown in FIG. 1.
Figure 3:
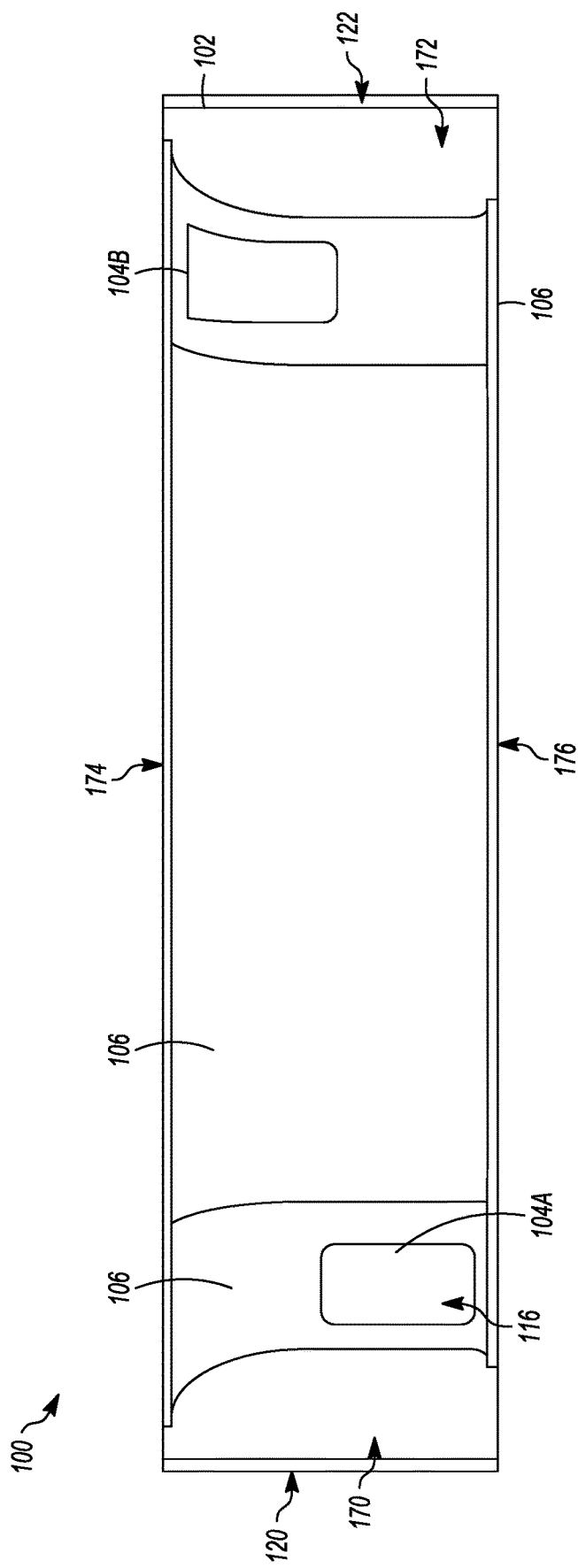
FIG. 3 illustrates a bottom plan view of the brake system shown in FIG. 1.
Figure 4:
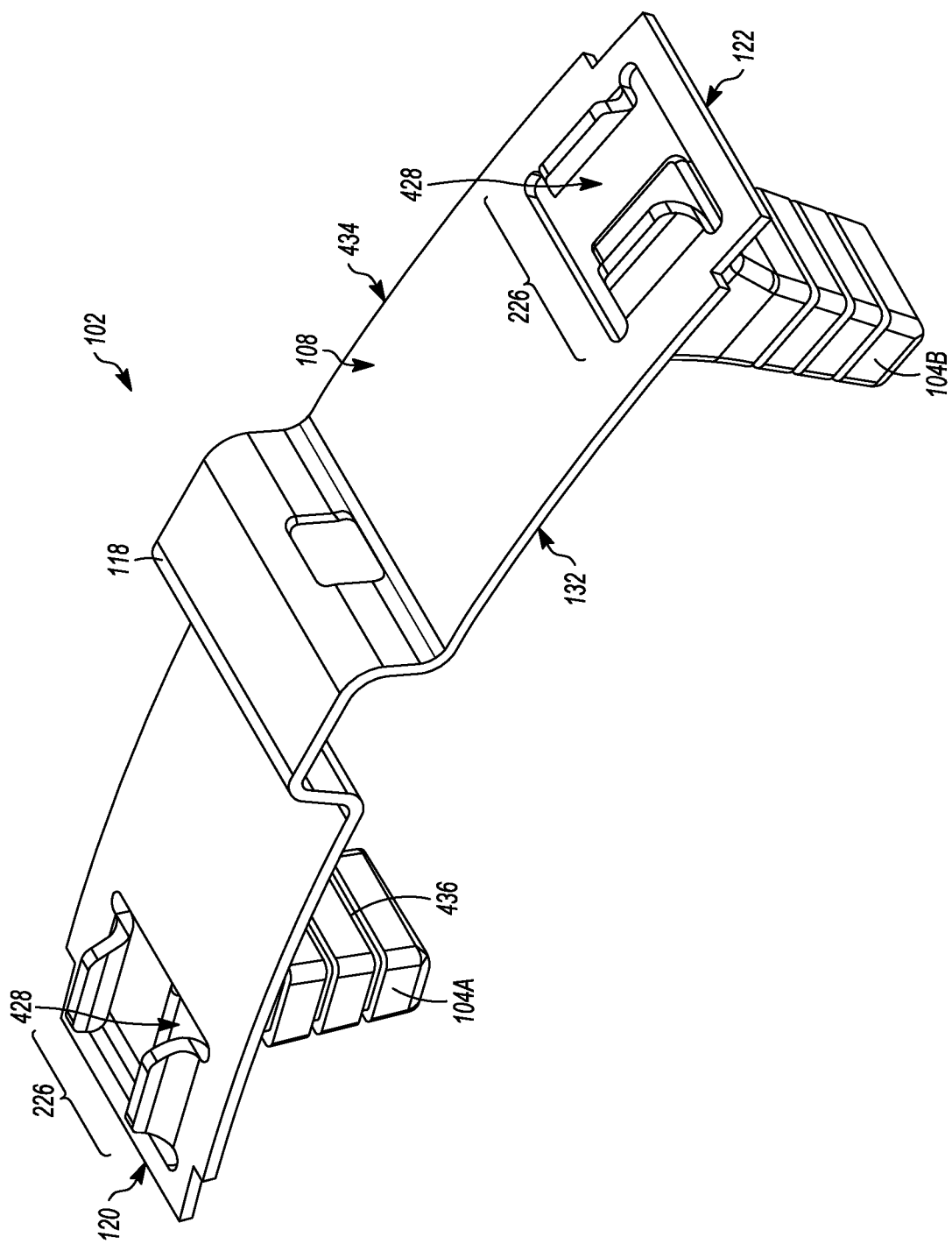
FIG. 4 illustrates a perspective view of the back plate shown in FIG. 1.
Figure 5:
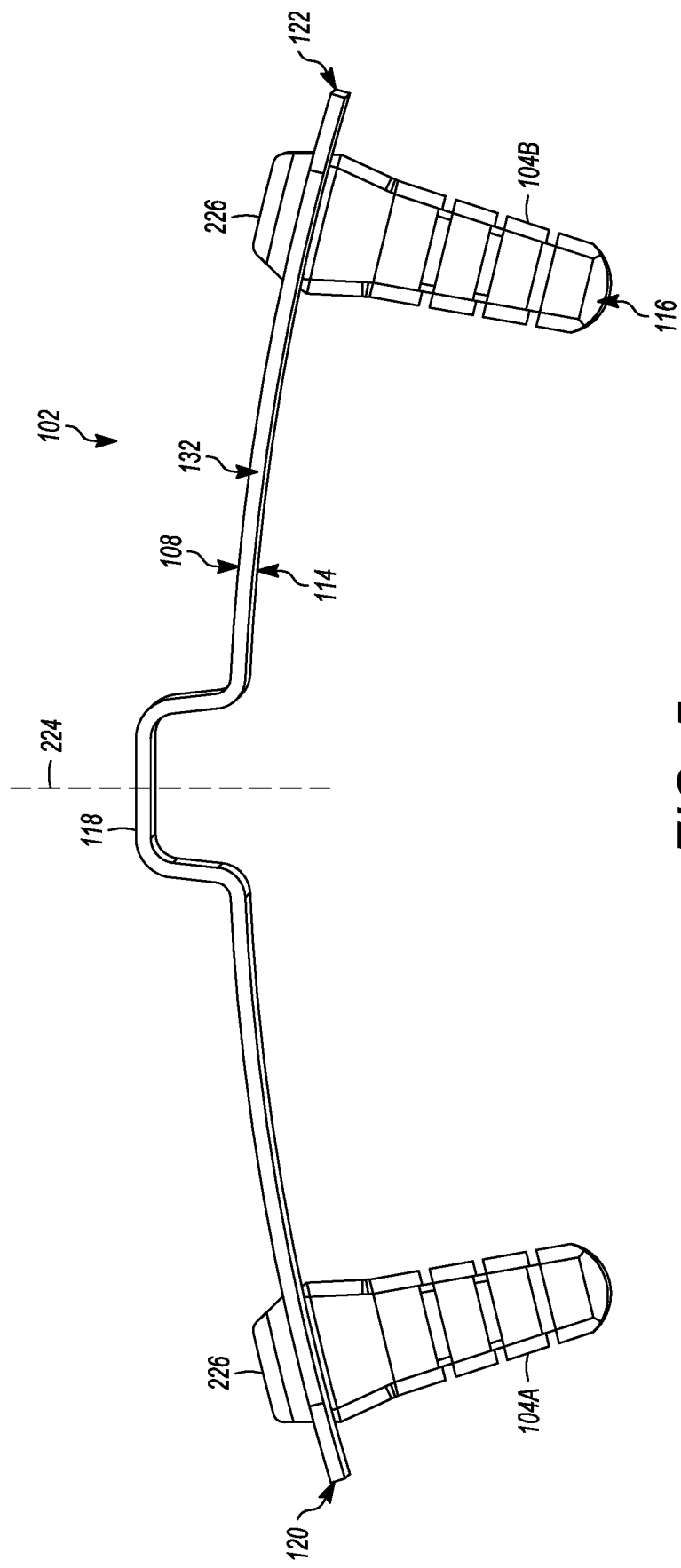
FIG. 5 illustrates a side elevational view of the back plate shown in FIG. 1.
Figure 6:
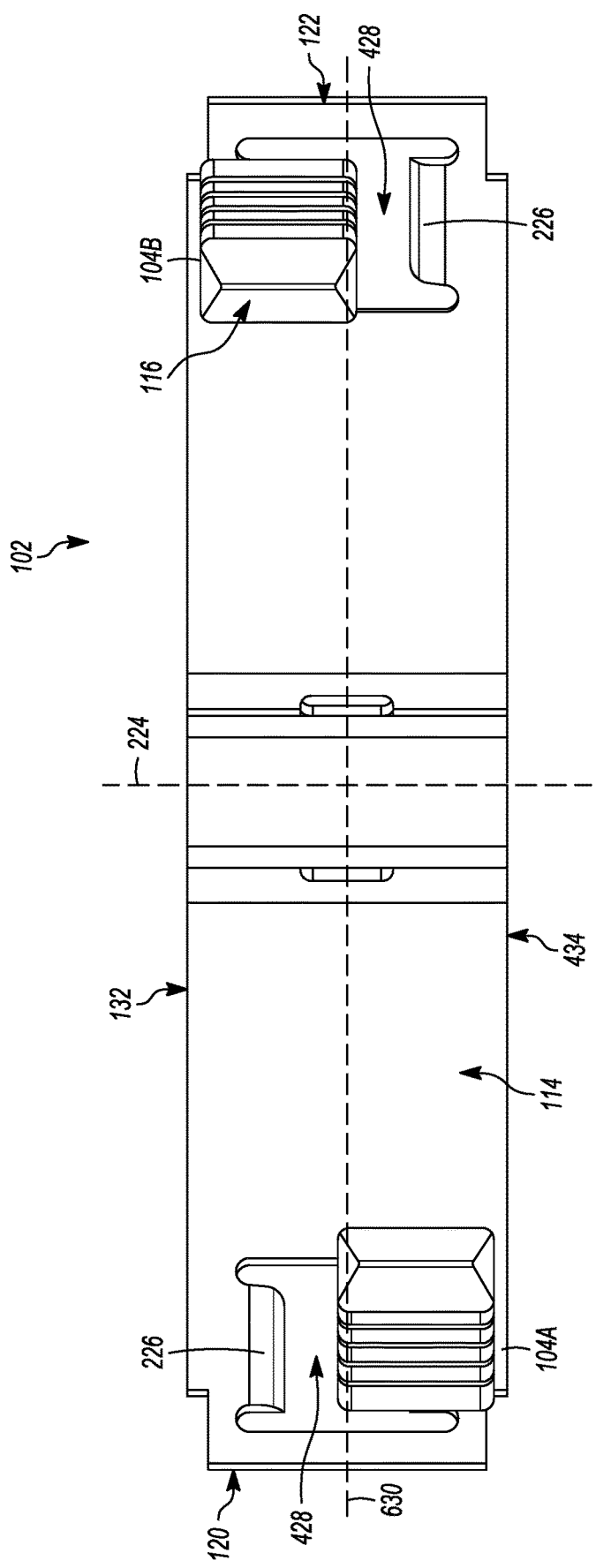
FIG. 6 illustrates a bottom plan view of the back plate shown in FIG. 1.

FIGS. 1 through 6 illustrate one example of a brake system 100 having a back plate 102 with conditioning inserts 104 (e.g., inserts 104A, 104B). FIG. 1 illustrates a perspective view of the brake system, FIG. 2 illustrates a side elevational view of the brake system shown in FIG. 1, FIG. 3 illustrates a bottom plan view of the brake system shown in FIG. 1, FIG. 4 illustrates a perspective view of the back plate shown in FIG. 1, FIG. 5 illustrates a side elevational view of the back plate shown in FIG. 1, and FIG. 6 illustrates a bottom plan view of the back plate shown in FIG. 1. The brake system includes a back plate that may support a composite brake pad 106. A head surface 108 of the back plate engages a brake head, which is moved toward a surface 210 of a wheel 212 (partially shown in FIG. 2) to move the brake system into contact with the wheel surface to slow or stop rotation of the wheel (and moved away from the wheel surface to move the brake pad and inserts away from and out of contact with the wheel surface). This wheel surface can extend along a circular path along the outer circumference of the wheel. For example, in rail vehicles, the wheel surface may be the outer circumference of the wheel that also contacts the rail during rotation of the wheel. A pad surface 114 of the back plate is opposite the head surface such that the pad surface and the head surface. The pad surface faces the wheel surface when the brake system is disposed on a vehicle. The pad surface also is coupled with the brake pad.

The brake pad may be formed from a composite material on the pad surface of the back plate (e.g., in a mold). Alternatively, the brake pad may be formed from another material and/or may be adhered to the pad surface or otherwise mechanically coupled with the pad surface (e.g., through a press fit, friction fit, or other connection). The brake pad extends from one end surface 170 to an opposite end surface 172, and from an inner surface 174 to an opposite outer surface 176. The inner and outer surfaces may extend from one end surface 170 to the other end surface 172. The inner surface can face the vehicle and/or the flange of the wheel, and the outer surface can face away from the vehicle and/or flange of the wheel.

The back plate includes at least one of the conditioning inserts coupled to the back plate and at least partially enclosed within the brake pad. While two inserts are shown in the illustrated embodiment, optionally, the brake system may include a single insert or three or more inserts. The conditioning inserts project from the pad surface such that each of the conditioning inserts is a cantilevered beam that extends from the pad surface to a free outer end 116. The free ends have contact surfaces that are positioned to engage the wheel surface. As shown in FIG. 5, the contact surfaces may be rounded or round surfaces. Alternatively, the contact surfaces may not be rounded (e.g., may be formed from one or more planes) or may be a combination of planar surfaces and rounded surfaces.

These contact surfaces can engage the wheel surface while the brake pad engages the wheel surface. The back plate (including the inserts) can be formed from a more rigid material (e.g., iron, an iron alloy, cast iron, ductile cast iron, malleable cast iron, gray cast iron, white cast iron, sintered metal, a sintered metal alloy, one or more steels such as carbon steel or cast steel), sintered metal, a sintered metal alloy, another metal or metal alloy, a composite material, or the like) than the pad so that contact between the pad and the wheel surface during a braking event generates friction to slow or stop wheel rotation while contact between the contact surfaces of the inserts and the wheel surface can scrape away or otherwise remove debris and clean the wheel surface during rotation of the wheel in the braking event. This contact between the contact surfaces and the wheel surface also can remove any protrusions, undulations, or the like, in the wheel surface (e.g., by grinding or otherwise removing small portions of the wheel surface). This cleaning, removal of debris or other objects, and/or smoothing out of the wheel surface can be referred to as conditioning the wheel surface. The inserts have tapered shapes such that the inserts have a smaller cross-sectional surface area at the outer ends than closer to the back plate. This can allow for the area of rubbing contact between the inserts and the wheel surface to increase over time and use as the inserts are worn down.

The back plate has an arcuate shape with a U-shaped (e.g., the shape of the letter U) coupler 118 that is centrally located between opposite ends 120, 122 of the back plate. The coupler may be connected with the brake head so that movement of the brake head toward or away from the wheel surface moves the back plate and brake pad toward and away from the wheel surface. As shown, the inserts may be disposed proximate to the ends of the back plate or distal from a middle 224 of the back plate (e.g., with the middle representing a plane or line located midway between the ends of the back plate along the arcuate path or surface of the pad surface of the back plate, as shown in FIG. 2). For example, the insert 104A may extend from the back plate in a location or area that is closer to the end 120 of the back plate than the other end 122 of the back plate and/or that is closer to the end 120 than the middle of the back plate. The insert 104B may extend from the back plate in a location or area that is closer to the other end 122 of the back plate than the end 120 of the back plate and/or that is closer to the end 122 than the middle of the back plate. Optionally, if only one insert is provided, the insert may be located closer to the end 120 than the middle or other end 122 of the back plate, or may be located closer to the end 122 than the middle or other end 120 of the back plate.

The back plate includes rejection lugs 226 (shown in FIG. 2) that engage the brake head. These rejection lugs can be tabs that are bent away from the head surface of the back plate. For example, each rejection lug can be bent tabs that are disposed on opposite sides of an opening 428 (shown in FIG. 4) through the back plate. Alternatively, the back plate may not include the openings. The tabs can be elongated in directions that extend from one end of the back plate to the opposite end of the back plate. Alternatively, the rejection lugs can have another shape and/or the openings through the back plate may not be present. The rejection lugs engage a brake head (in addition to or instead of the coupler engaging the brake head) to secure the back plate and the brake pad to the brake head. The rejection lugs can assist with heat transfer out of the brake system. For example, the tabs can transfer heat from the back plate out of the brake system and/or the openings between the tabs can provide a channel through which heat is dissipated.

In the illustrated example, the inserts are disposed opposite the rejection lugs, as shown in FIG. 5. The inserts may be coupled with the back plate but partially extend beneath the openings within the rejection lugs (shown in FIGS. 4 and 6). Optionally, at least one of inserts may be located between one of the ends of the back plate and the opening of the rejection lug that is nearest that end of the back plate. For example, part of an insert may be located between one end of the back plate and the rejection lug opening nearest that end, with part of the insert beneath the opening. Alternatively, all of the insert may be located between the end of the back plate and the rejection lug opening. Optionally, the insert may be located inside (e.g., between) the rejection lugs, as described below.

The inserts are offset inserts due to the inserts not being centrally located on a centerline 630 (shown in FIG. 6) of the back plate. The centerline may extend from one end of the back plate to the opposite end of the back plate. The back plate can have opposite edges 132, 434 that are orthogonal or perpendicular to the ends. Alternatively, the edges may be transverse to the ends. The centerline may be halfway or midway between these edges, and may be parallel to the edges (as shown in FIG. 6).

In the illustrated embodiment, substantially all of each insert is disposed on one side of the centerline, but at least a portion of each insert extends over or across the centerline. For example, at least 99% of the mass of each insert may be on one side of the centerline with the remaining 1% or less of the mass being on the other side of the centerline. In another example, at least 95% of the mass of each insert may be on one side of the centerline with the remaining 5% or less of the mass being on the other side of the centerline. In another example, at least 90% of the mass of each insert may be on one side of the centerline with the remaining 10% or less of the mass being on the other side of the centerline. In another example, at least 80% of the mass of each insert may be on one side of the centerline with the remaining 20% or less of the mass being on the other side of the centerline. Optionally, at least 99% of the volume of each insert may be on one side of the centerline with the remaining 1% or less of the volume being on the other side of the centerline. In another example, at least 95% of the volume of each insert may be on one side of the centerline with the remaining 5% or less of the volume being on the other side of the centerline. In another example, at least 90% of the volume of each insert may be on one side of the centerline with the remaining 10% or less of the volume being on the other side of the centerline. In another example, at least 80% of the volume of each insert may be on one side of the centerline with the remaining 20% or less of the volume being on the other side of the centerline. Alternatively, the entire mass and/or the entire volume of each insert may be on one side of the centerline.

The inserts may be predominantly disposed on opposite sides of the centerline. For example, at least 99%, 95%, 90%, or 80% of the mass and/or volume of each insert may be on a different side of the centerline in different embodiments. The inserts can be in different locations relative to or from the centerline to condition different portions of the wheel surface. For example, the insert 104A can contact and condition a first portion of the width of the wheel surface (e.g., one half or more than one half of the wheel surface) while the insert 104B can contact and condition a second portion of the width of the wheel surface (e.g., the other half or more than half of the wheel surface). Alternatively, three or more offset inserts may be provided, with each insert positioned to engage and condition a different portion of the width of the wheel surface. The width of the wheel surface can be the distance along or parallel to a rotation axis of the wheel (that is perpendicular to the plane of FIG. 2). Each offset insert can contact and condition a different fraction of the width of the wheel surface that contacts a route surface, such as the surface of a rail for rail vehicles. For example, if there are n offset inserts coupled with the back plate and the width of the wheel surface that engages the route surface is W, then each offset insert can contact and condition at least W/n of the wheel surface. Using the offset inserts can reduce the amount of material used to create the back plate and inserts, can reduce the weight of the back plate and inserts, or the like (relative to the inserts extending over the entire width of the wheel surface).

The conditioning inserts include engagement features 436 that assist in coupling the inserts with the brake pad. In the illustrated example, the engagement features are troughs, grooves, valleys, or other recesses that extend inward and into the bodies of the inserts. The material forming the brake pad can flow into the engagement features during molding of the brake pad. This can increase the surface area of the inserts that engages the brake pad (relative to the inserts not having the engagement features), which can increase the bonding strength between the inserts and the brake pad.

Figure 7:
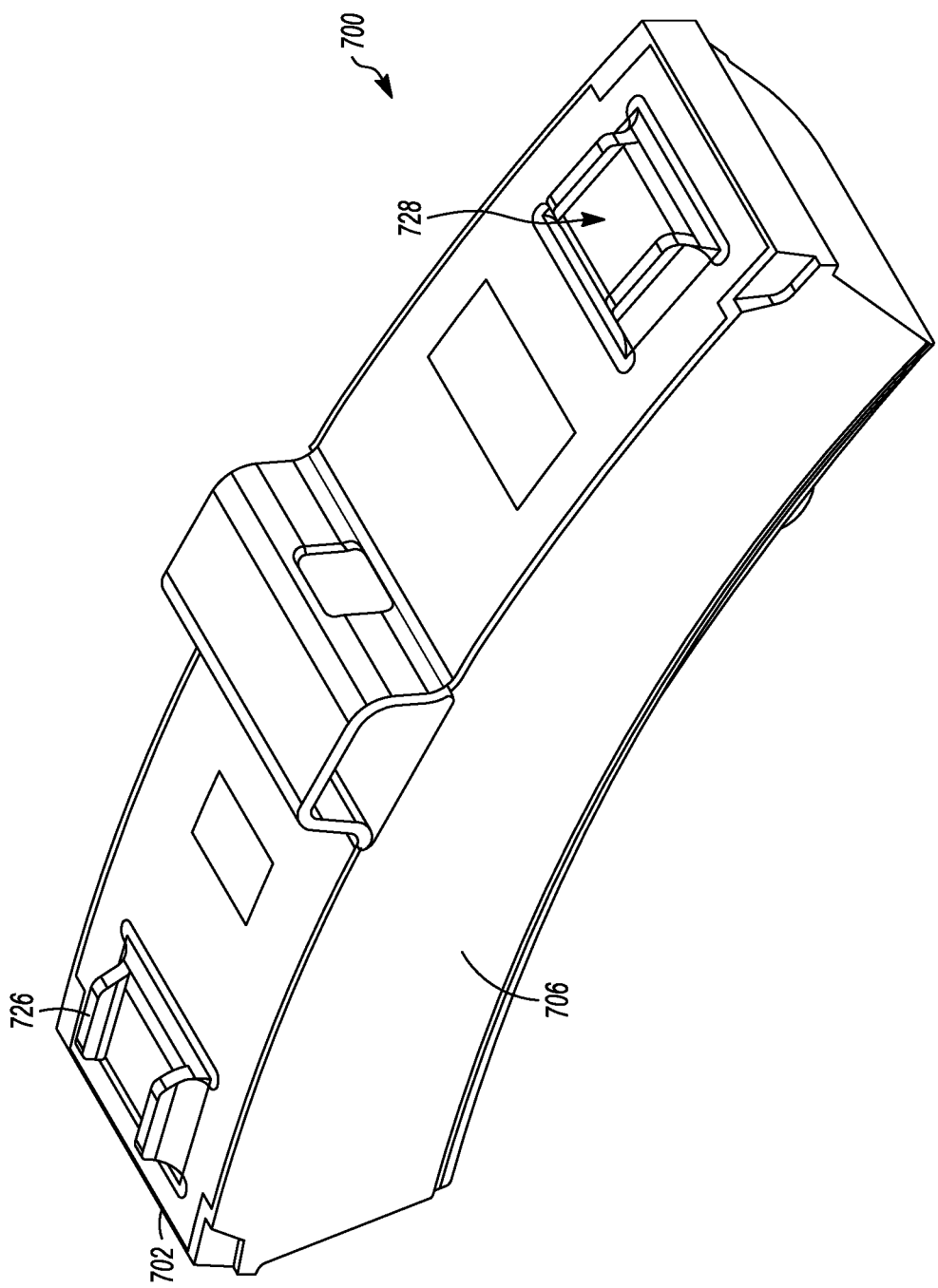
FIG. 7 illustrates a perspective view of the brake system.
Figure 8:
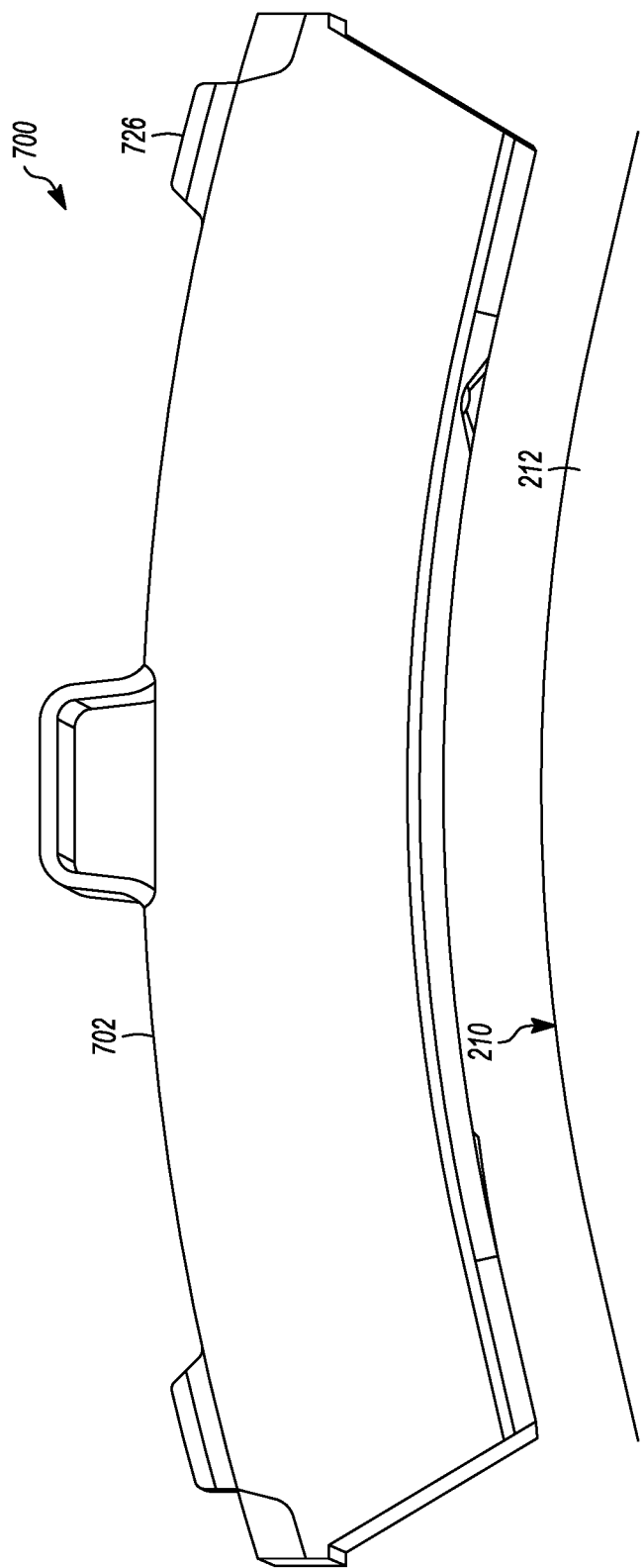
FIG. 8 illustrates a side elevational view of the brake system shown in FIG. 7.
Figure 9:
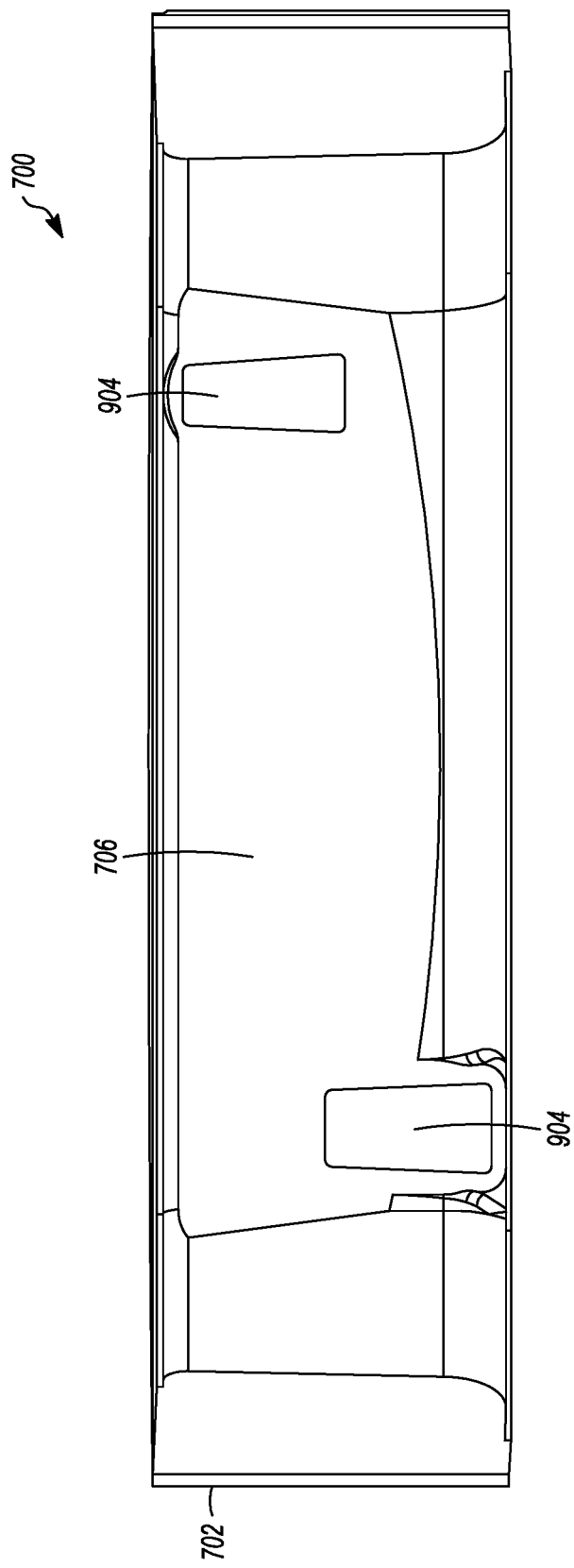
FIG. 9 illustrates a bottom plan view of the brake system shown in FIG. 7.
Figure 10:
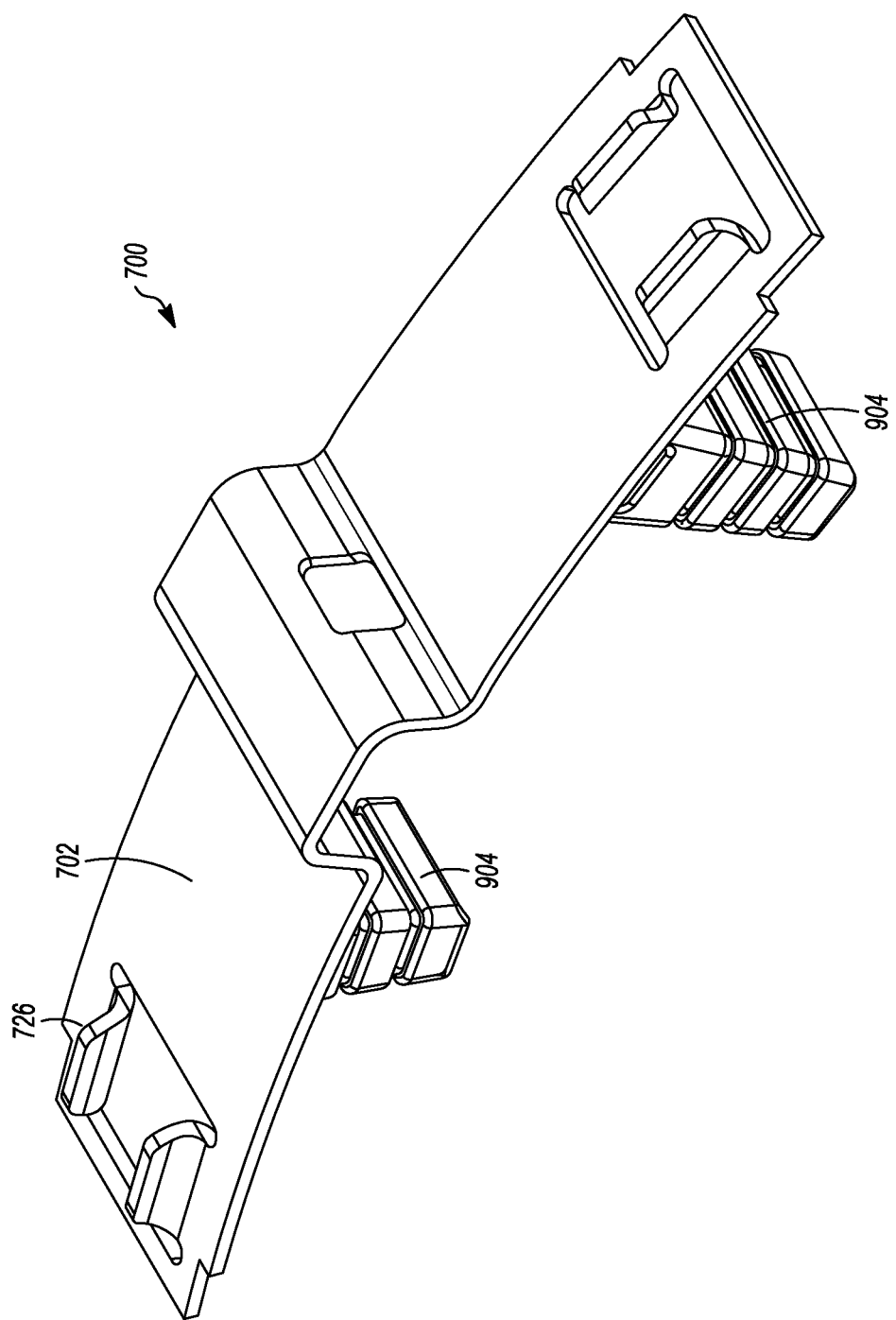
FIG. 10 illustrates a perspective view of the back plate shown in FIG. 7.
Figure 11:
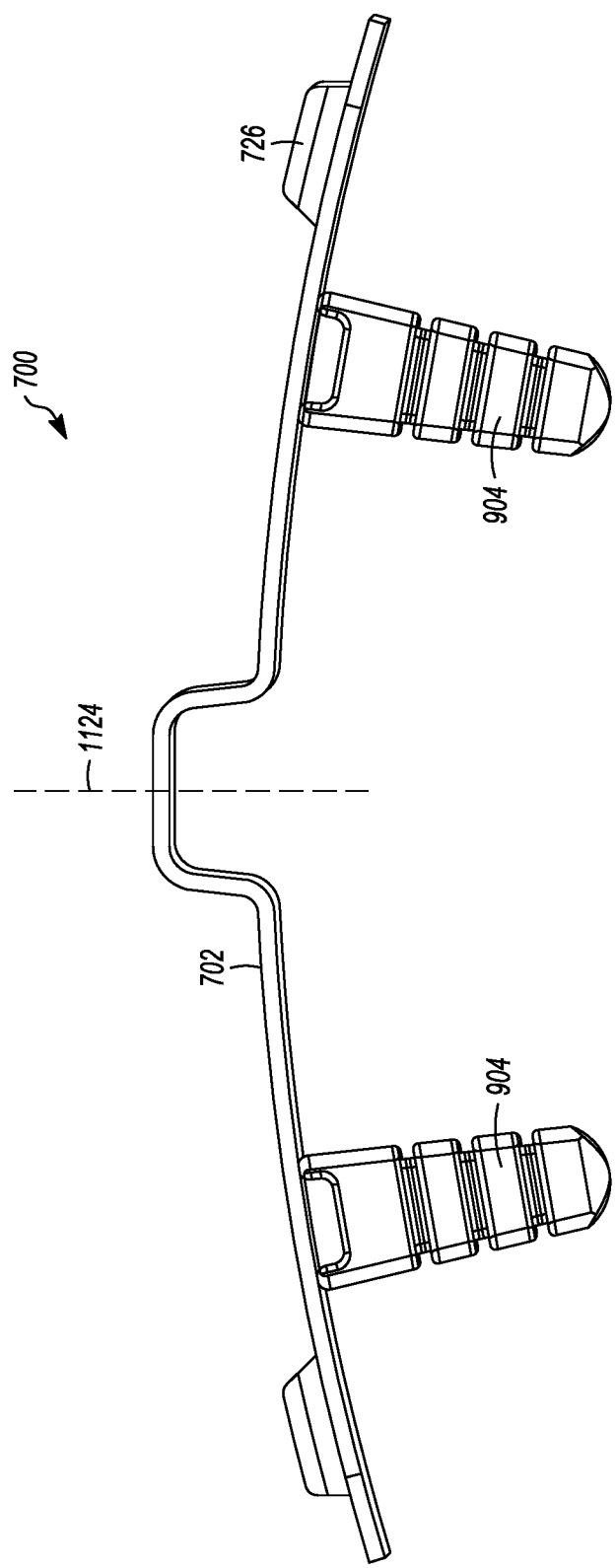
FIG. 11 illustrates a side elevational view of the back plate shown in FIG. 7.
Figure 12:
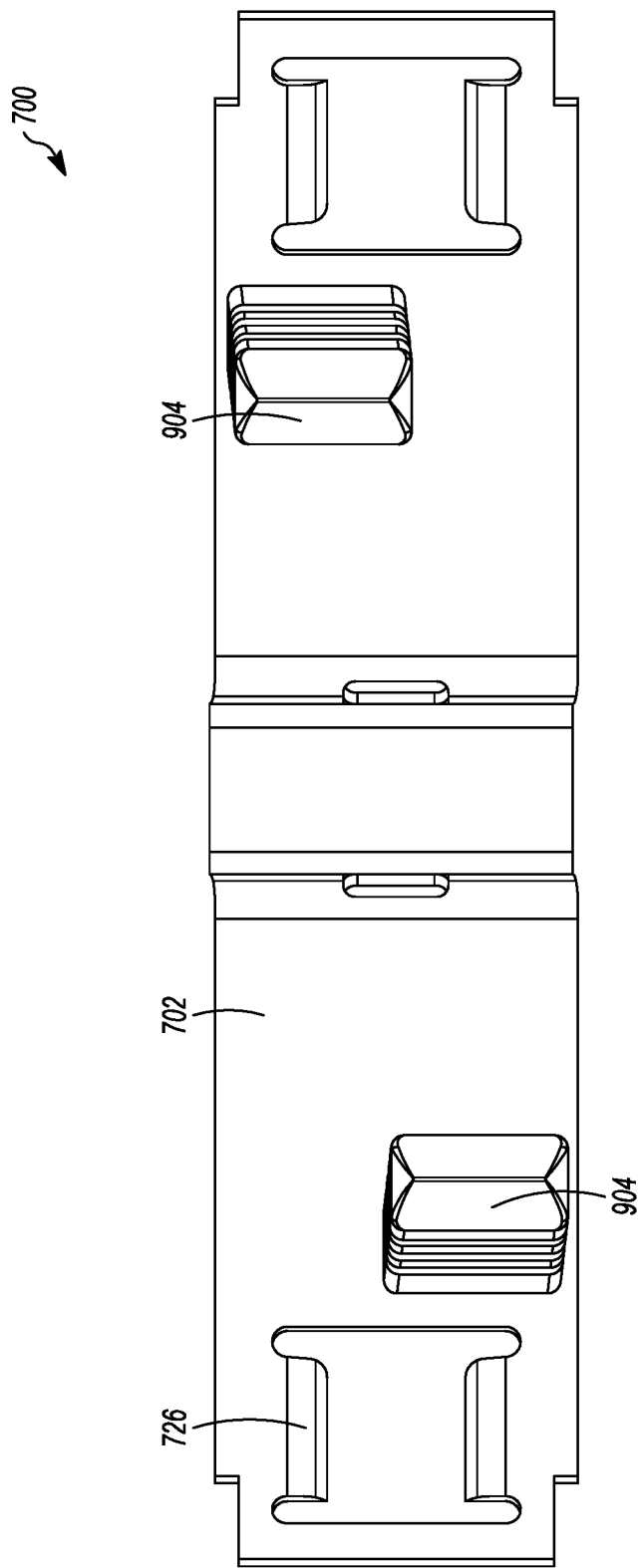
FIG. 12 illustrates a bottom plan view of the back plate shown in FIG. 7.

FIGS. 7 through 12 illustrate another example of a brake system 700 having a back plate 702 with conditioning inserts 904 (shown in FIG. 9) partially embedded within a brake pad 706. FIG. 7 illustrates a perspective view of the brake system, FIG. 8 illustrates a side elevational view of the brake system shown in FIG. 7, FIG. 9 illustrates a bottom plan view of the brake system shown in FIG. 7, FIG. 10 illustrates a perspective view of the back plate shown in FIG. 7, FIG. 11 illustrates a side elevational view of the back plate shown in FIG. 7, and FIG. 12 illustrates a bottom plan view of the back plate shown in FIG. 7. The brake system shown in FIGS. 7 through 12 can be similar to the brake system shown in FIGS. 1 through 6, except for the locations of the inserts 904. For example, the components of the brake systems shown in FIGS. 1 through 12 may be the same except for the locations of the inserts.

The inserts of the brake system shown in FIGS. 1 through 6 can be disposed opposite the rejection lugs. In contrast, the inserts of the brake system shown in FIGS. 7 through 12 may be disposed inside of the rejection lugs 726 and openings 728. For example, each insert of the brake system shown in FIGS. 7 through 12 can be located between one of the rejection lugs and a middle 1124 of a back plate 702 of the brake system, as shown in FIGS. 10 through 12. Alternatively, the inserts can be disposed closer to the middle of the back plate than what is shown in FIGS. 10 through 12.

As shown in FIGS. 1, 3, and 9, the outer ends of the conditioning inserts may be exposed and not enclosed within the brake pads. The outer ends of the conditioning inserts may be coextensive with an outer lower surface of the brake pad that engages the wheel surface prior to installing the brake system on a vehicle. Consequently, when the brake system engages the wheel surface for the first time after installation of the brake system, both the brake pad and the outer ends of the conditioning inserts may touch the wheel surface. This can avoid requiring usage of the brake system for several duty cycles or brake events over several trips before the outer ends of the conditioning inserts are exposed to contact the wheel surface. For example, some other known brake systems may enclose the outer ends of the conditioning inserts within the brake pad. As a result, the portion of the brake pad that is between the wheel surface and the outer ends of the conditioning inserts may need to be worn down and removed from the brake pad (e.g., by contact with the wheel surface during several braking events) before the outer ends of the conditioning inserts are exposed and able to contact the wheel surface.

Figure 13:
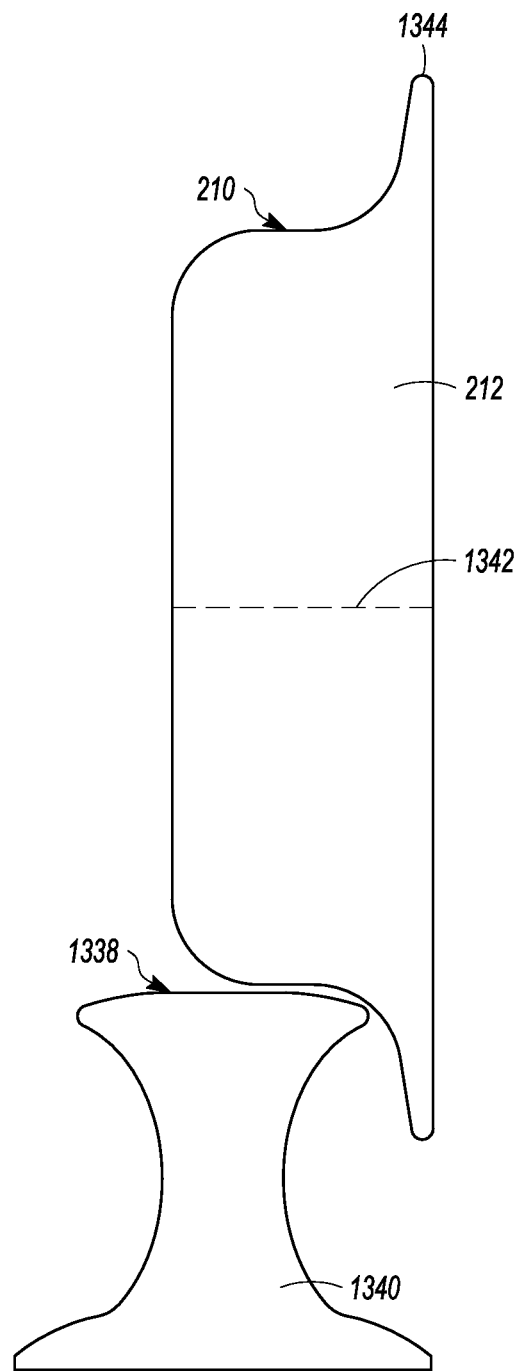
FIG. 13 schematically illustrates a cross-sectional view of a wheel shown in FIG. 2.
Figure 15:
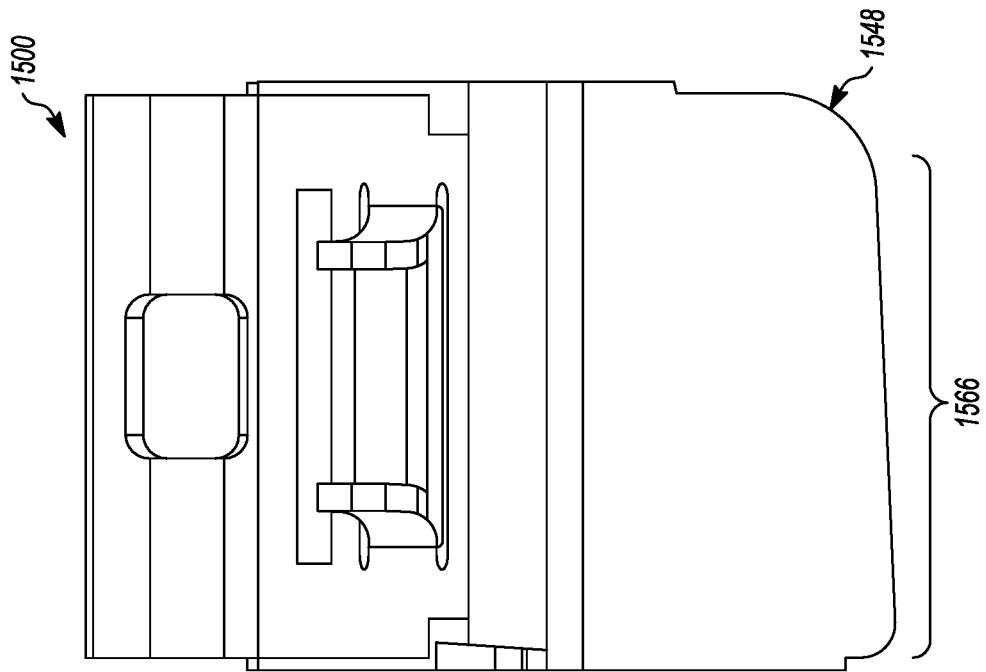
FIG. 15 illustrates an elevational end view of another example of a brake system.
Figure 14:
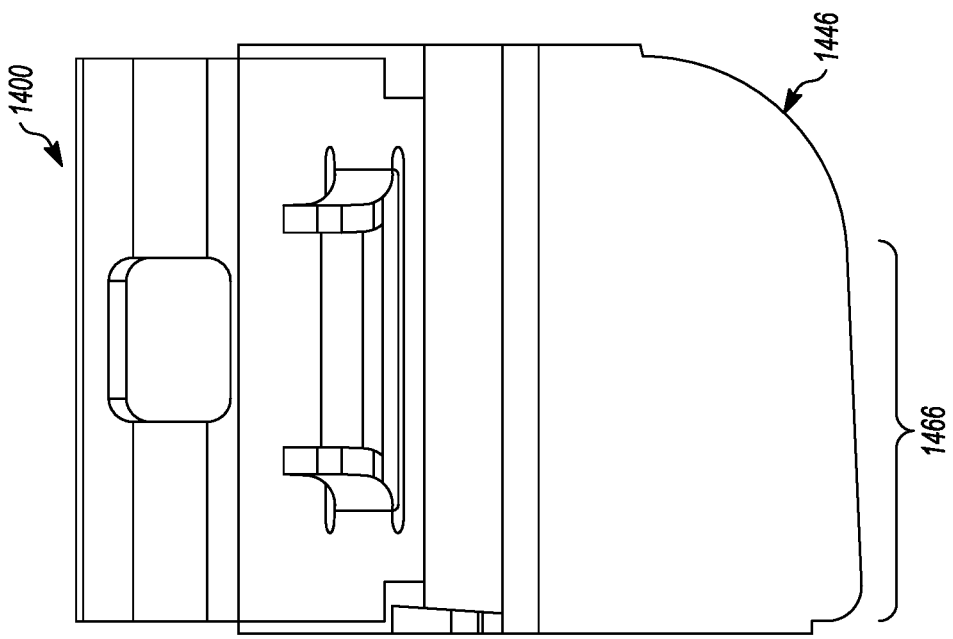
FIG. 14 illustrates an elevational end view of one example of a brake system.

FIG. 13 schematically illustrates a cross-sectional view of the wheel 212 shown in FIG. 2. The wheel includes the wheel surface 210 that engages the route surface 1338 of a route 1340 (e.g., the top surface of a rail) as the wheel rotates around the rotation axis 1342. The wheel also includes a flange 1344 that can help assist keeping the wheels of a vehicle on the route. With continued reference to the wheel shown in FIG. 13, FIG. 14 illustrates an elevational end view of one example of a brake system 1400 and FIG. 15 illustrates an elevational end view of another example of a brake system 1500. Each of the brake systems shown in FIGS. 14 and 15 can represent one of the brake systems shown and/or described herein. The end views of the brake systems show rounded sides 1446, 1548 of brake pads 1406, 1506. These brake pads can represent one or more of the brake pads shown and/or described herein.

The rounded sides of the brake pads face the flange of the wheel or the intersection between the flange and the surface 210 of the wheel. The rounded side of the brake system shown in FIG. 14 has a larger radius of curvature than the rounded side of the brake system shown in FIG. 15. The smaller radius of curvature can allow for more of a working surface 1466 of the brake pad 1400 to contact the wheel surface 210 and/or flange 1344 of the wheel when compared with a working surface 1566 of the brake pad 1500 having the smaller radius of curvature. As a result, the brake pad 1500 may slow or stop rotational movement of the wheel (into or out of the plane of FIG. 13) more rapidly than the brake pad 1400 even during the first use of the brake pads 1400, 1500.

Figure 16:
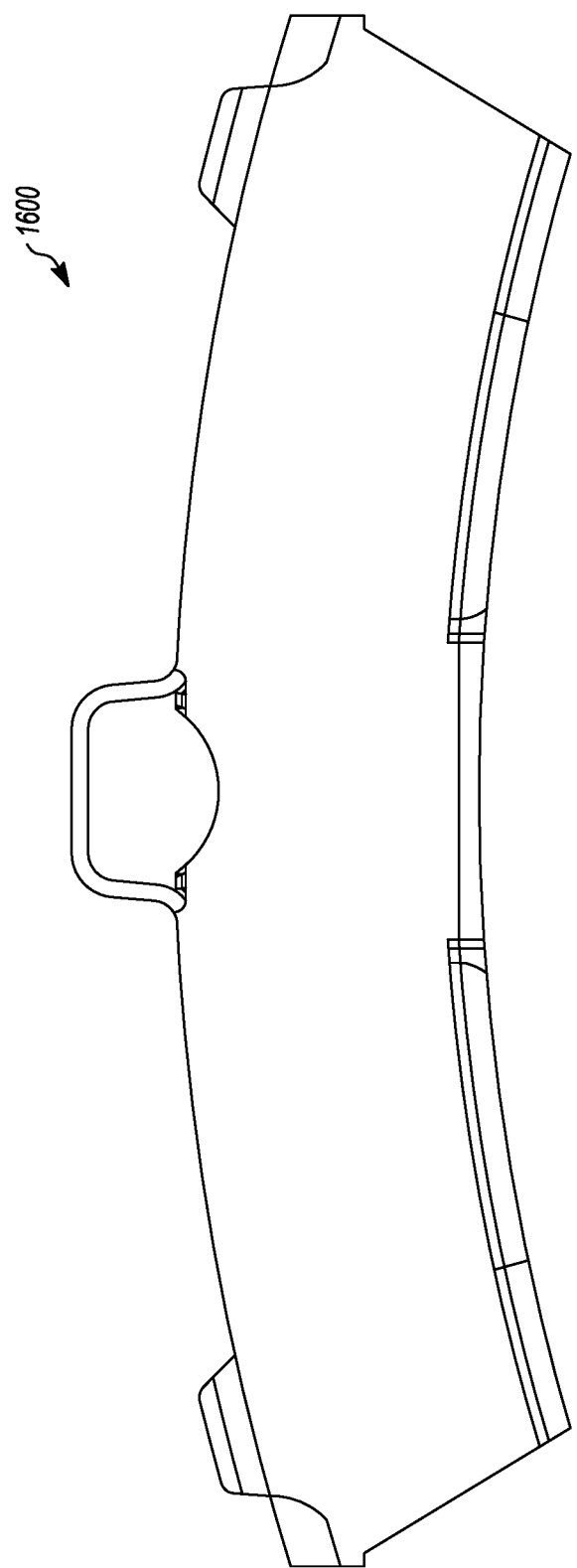
FIG. 16 illustrates a side elevational view of the brake system.
Figure 17:
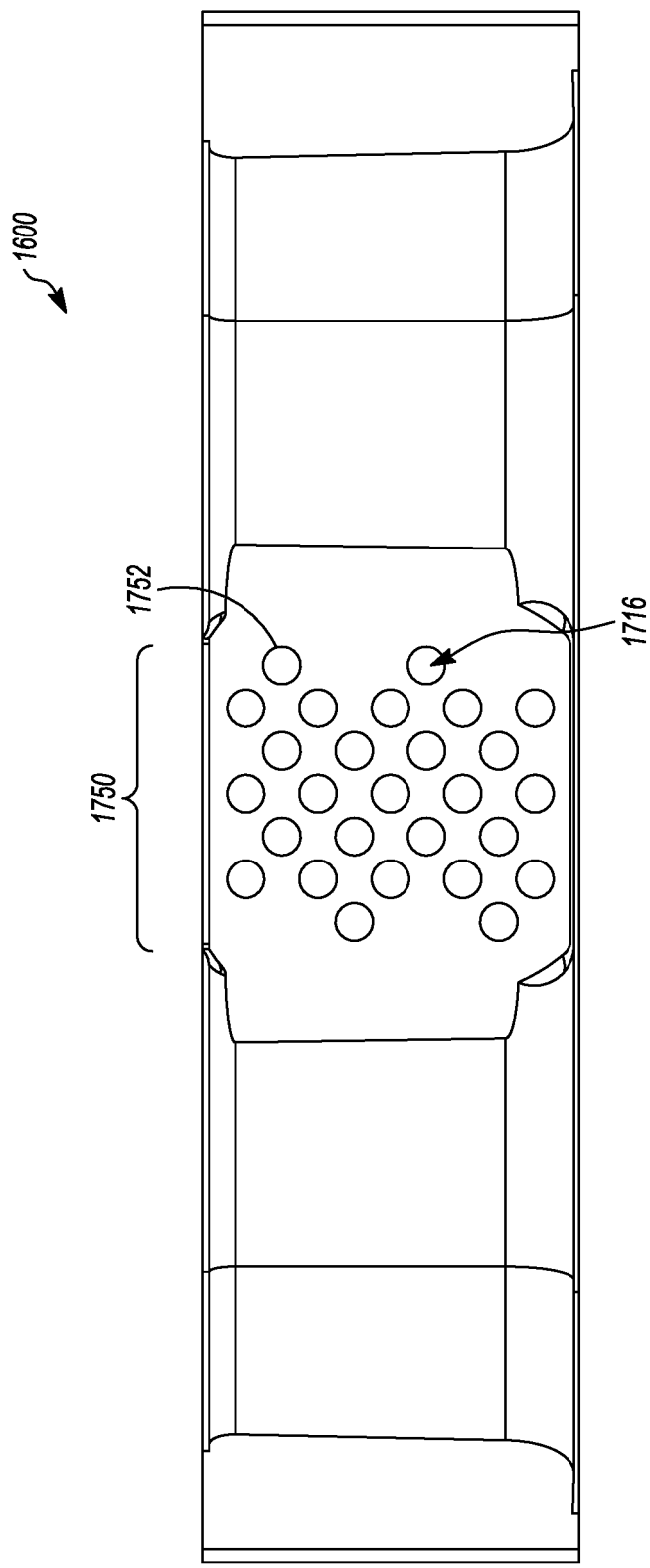
FIG. 17 illustrates a bottom plan view of the brake system shown in FIG. 16.
Figure 18:
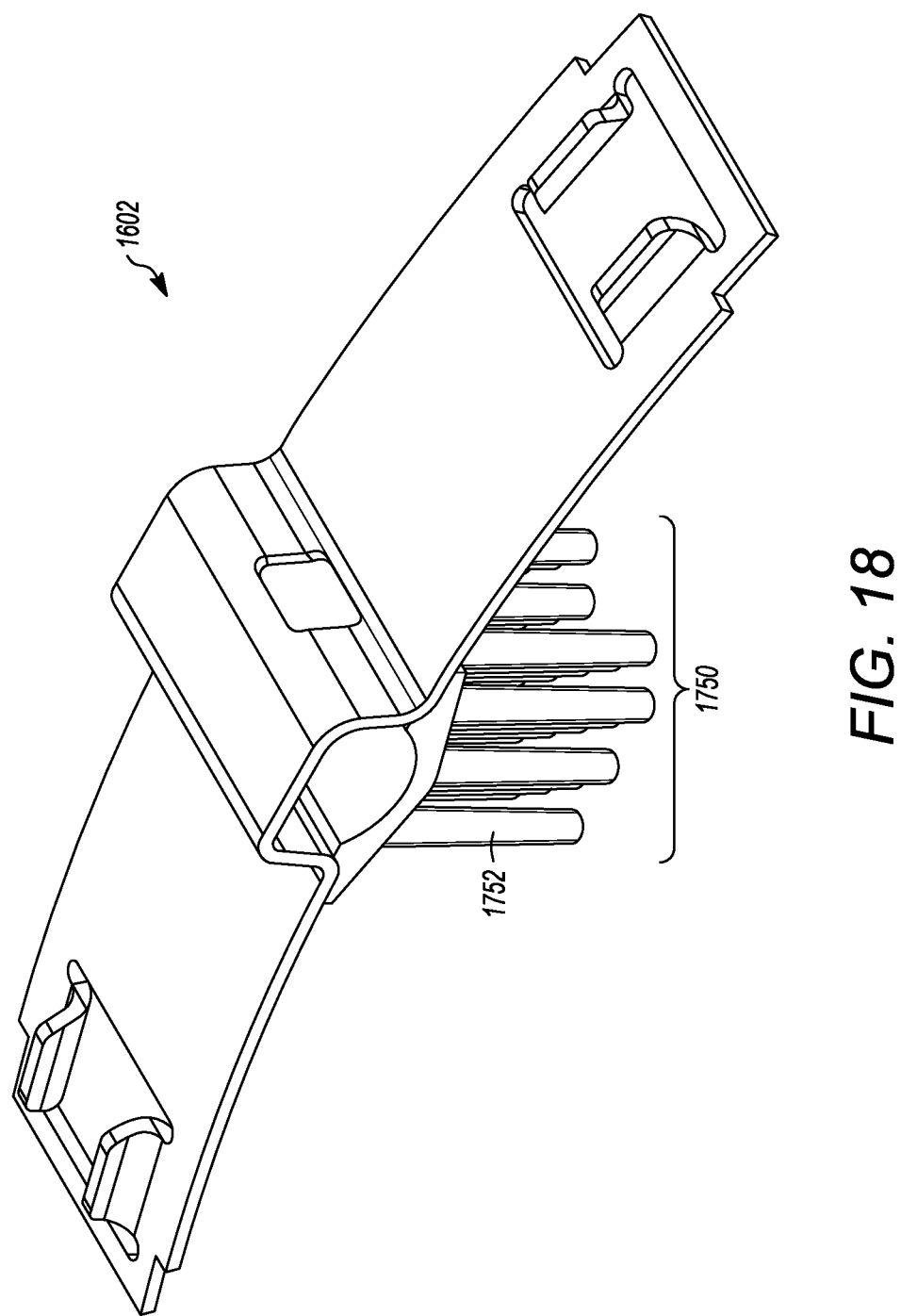
FIG. 18 illustrates a perspective view of the back plate shown in FIG. 16.
Figure 19:
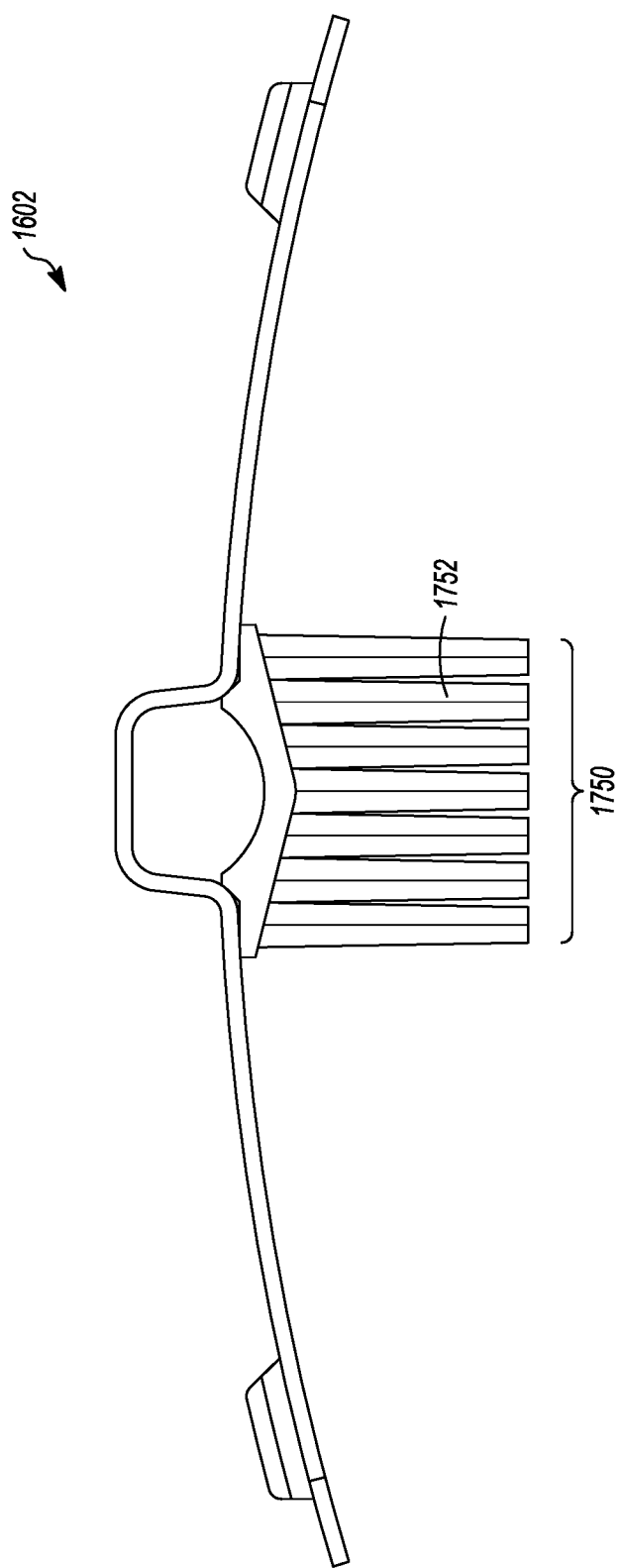
FIG. 19 illustrates a side elevational view of the back plate shown in FIG. 16.
Figure 20:
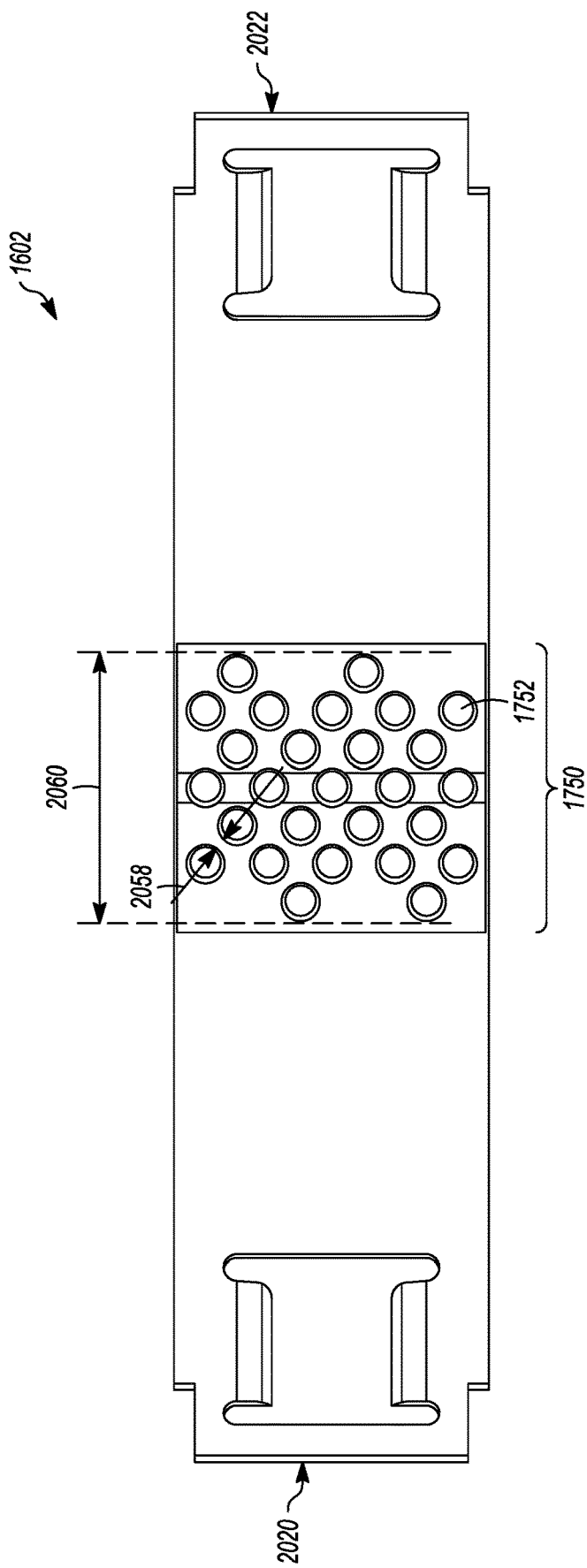
FIG. 20 illustrates a bottom plan view of the back plate shown in FIG. 16.

FIGS. 16 through 20 illustrate another example of a brake system 1600 having a back plate 1602 with an array 1750 of conditioning insert pins 1752 (shown in FIG. 17). FIG. 16 illustrates a side elevational view of the brake system, FIG. 17 illustrates a bottom plan view of the brake system shown in FIG. 16, FIG. 18 illustrates a perspective view of the back plate shown in FIG. 16, FIG. 19 illustrates a side elevational view of the back plate shown in FIG. 16, and FIG. 20 illustrates a bottom plan view of the back plate shown in FIG. 16. The brake system shown in FIGS. 16 through 20 can be similar to the brake systems shown and/or described herein, except for the conditioning inserts. For example, the components of the brake systems shown in FIGS. 1 through 12 and 16 through 20 may be the same except for the inserts.

As shown in FIGS. 17 through 20, the conditioning insert of the back plate is formed by the array of elongated conditioning insert pins. Each of the insert pins is a cantilevered beam that is elongated from a pad surface 1914 (shown in FIG. 19) of the back plate to an outer end 1716 (shown in FIG. 17). Each of the insert pins has a significantly smaller aspect ratio when compared to the aspect ratio of the conditioning inserts shown in FIGS. 1 through 12. For example, the diameter or width of each insert pin divided by the length of the insert pin may be one or more orders of magnitude smaller than the width of the insert (shown in FIGS. 1 through 12) divided by the length of the insert (shown in FIGS. 1 through 12). The insert pins can be arranged in a repeating pattern within the array. In the illustrated example, the pins are arranged in nine rows of three pins, with the pins in each row disposed midway between neighboring pins in the rows on either side. Alternatively, a greater or fewer number of pins can be provided and/or the pins can be arranged in a different pattern.

The pins can be more tightly packed together or spaced farther apart than what is shown in FIG. 20. For example, an intra-pin spacing 2058 can represent the closest distance between neighboring or adjacent pins. This intra-pin spacing can be lengthened or shortened to space out or more tightly pack the pins. As the intra-pin spacing increases, the pressure exerted onto the brake system by the wheel surface is distributed over a larger area of the working surface of the brake shoe as the material forming the pins (e.g., iron, an iron alloy, cast iron, ductile cast iron, malleable cast iron, gray cast iron, another metal or metal alloy, a composite material, or the like) is less compressible than the surrounding composite friction material forming the brake pad. The intra-pin spacing, number of pins, and/or number of arrays can be varied to control distribution of this pressure to reduce cracking, wear, or the like, of the brake system.

The array is spaced apart from the rejection lugs and the ends of the back plate. For example, the array does not extend to the rejection lugs or the ends of the back plate, but is separated and spaced apart from the lugs and back plate ends by distances that are longer than a width 2060 of the array. Alternatively, the array can be wider. For example, the array may extend from one end of the back plate to the other end, from one rejection lug to the other rejection lug, or may be wider but not extend to the rejection lugs or ends.

The array of insert pins in the illustrated example also differs from the conditioning inserts shown in FIGS. 1 through 12 due to the array being centrally located along the length of the back plate. For example, the array may be located equidistant from opposite ends 2020, 2022 of the back plate, as shown in FIG. 20. Alternatively, the array may not be centrally located but may be closer to one end of the back plate than the opposite end of the back plate. For example, the array can be an offset array that is closer to one end 2020 or 2022 than the other end 2022 or 2020.

Using the several smaller insert pins instead of a larger monolithic inserts can allow for the material forming the brake pad to move in and between the pins (e.g., during molding of the brake pad material). The brake pad material can flow between the pins and increase the surface area over which the brake pad and the pins contact each other. This can increase the bonding strength between the brake pad and insert pins, which can improve the resistance of the brake system to cracking relative to brake systems having larger monolithic inserts without any grooves or other features.

Figure 21:
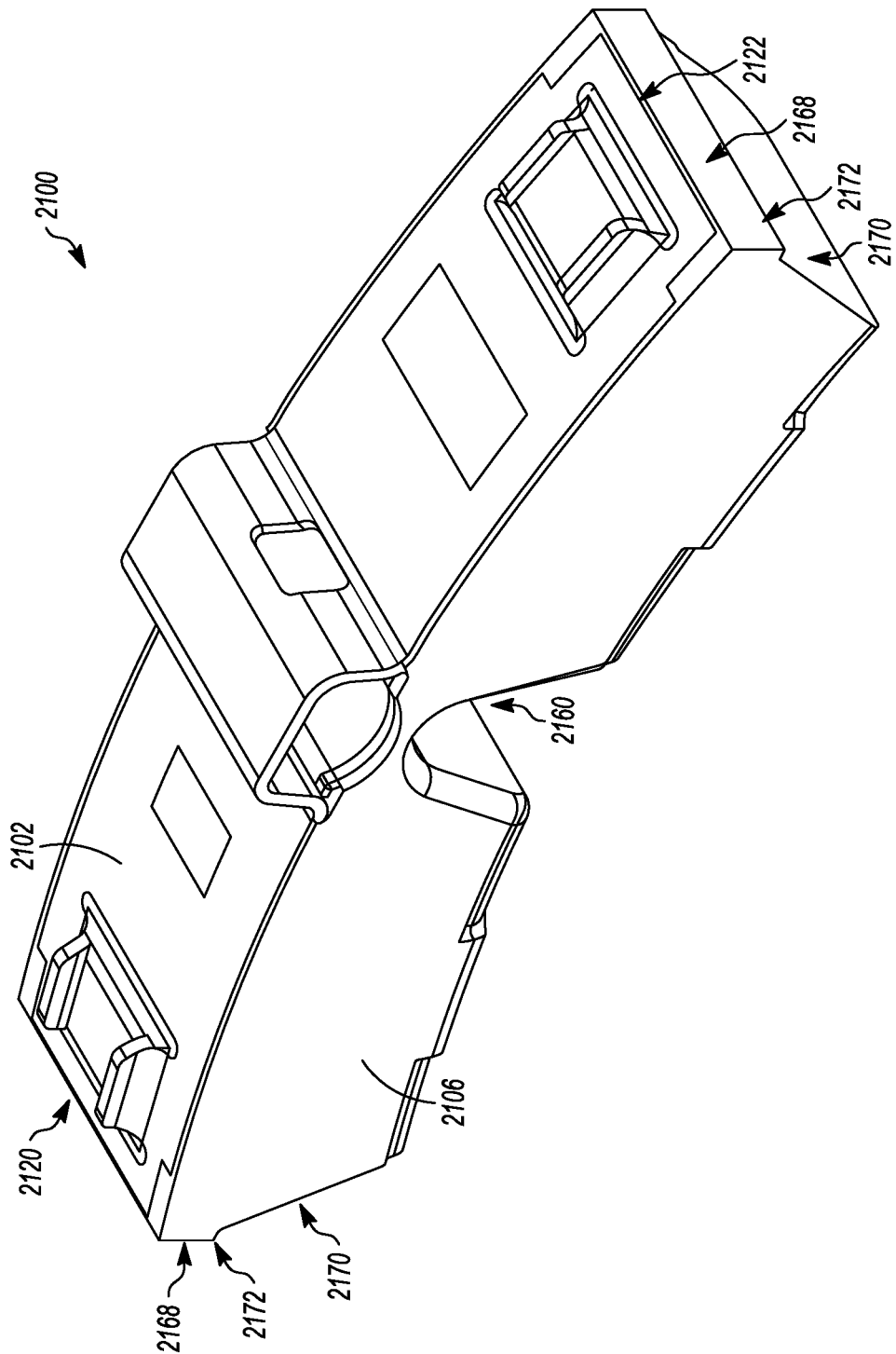
FIG. 21 illustrates a perspective view of the brake system.
Figure 22:
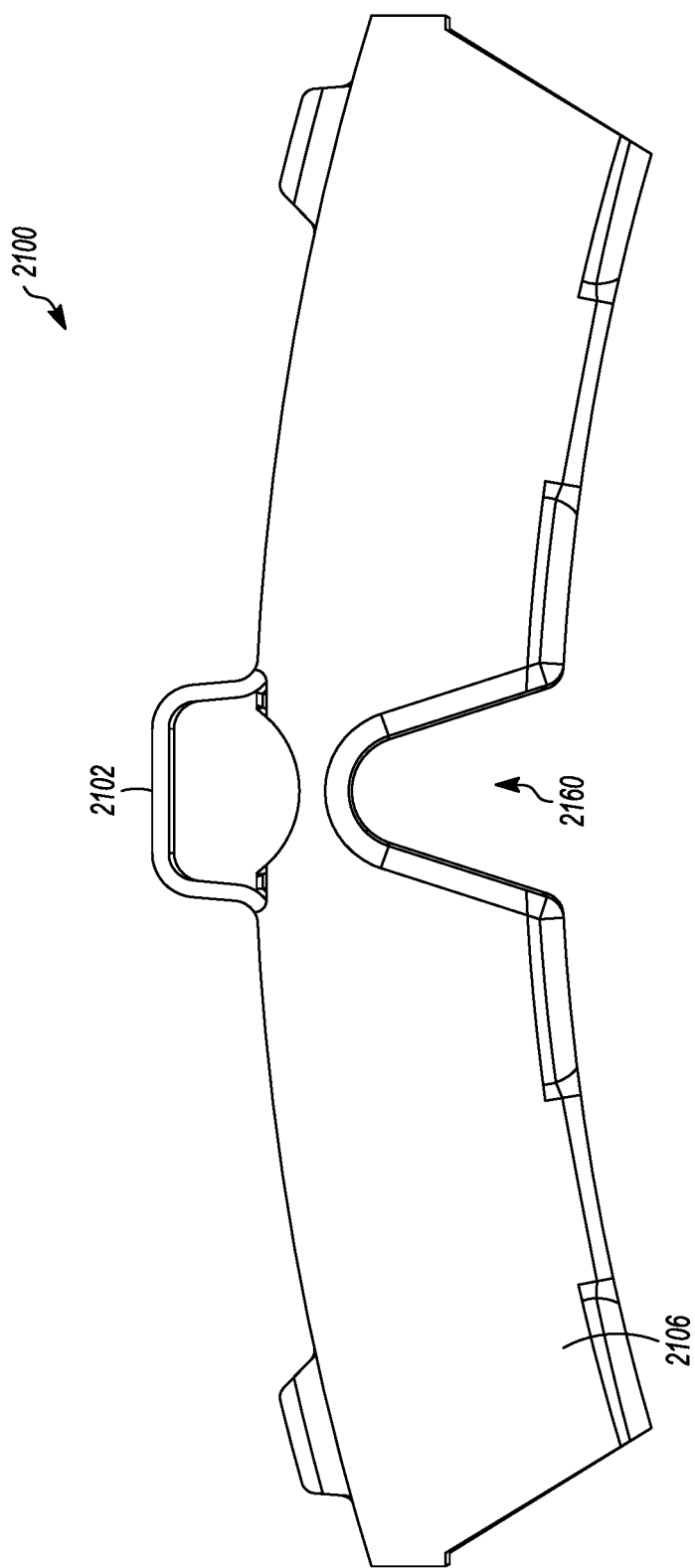
FIG. 22 illustrates a side elevational view of the brake system shown in FIG. 21.
Figure 23:
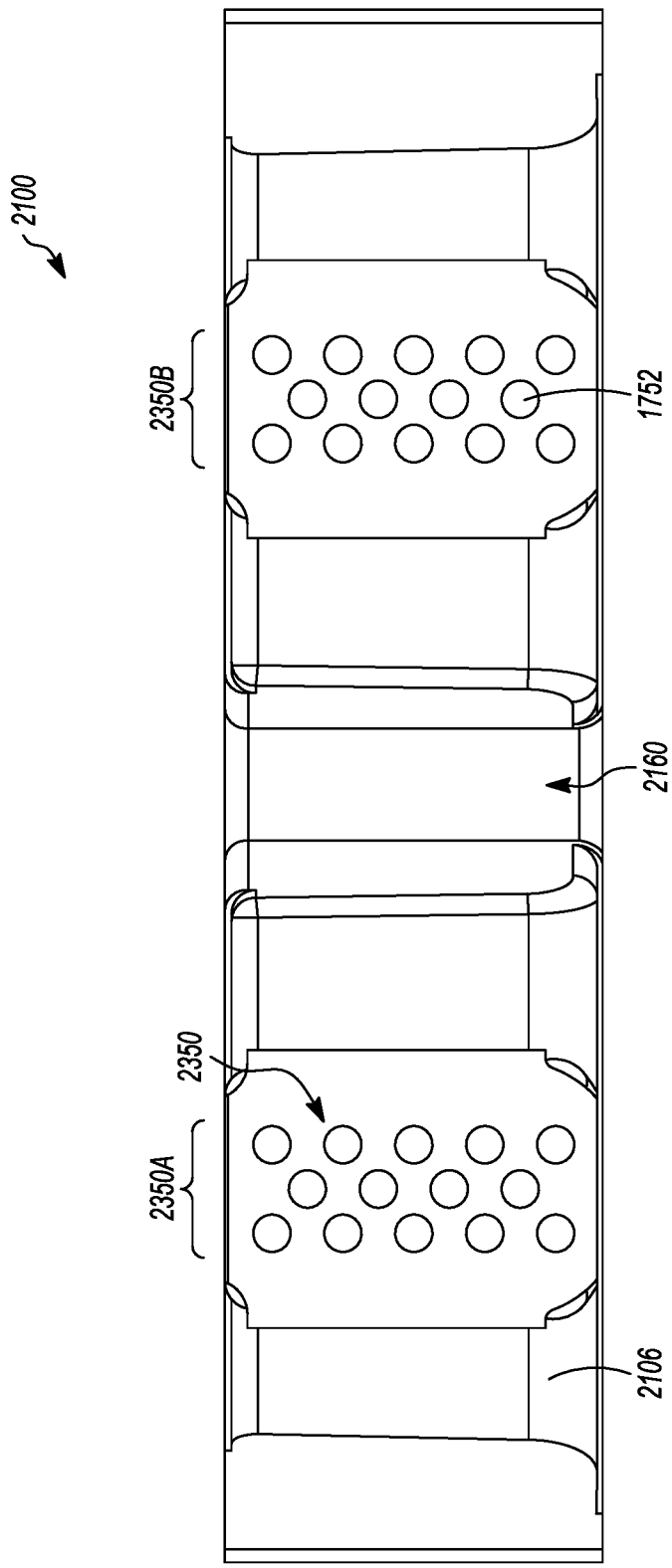
FIG. 23 illustrates a bottom plan view of the brake system shown in FIG. 21.
Figure 24:
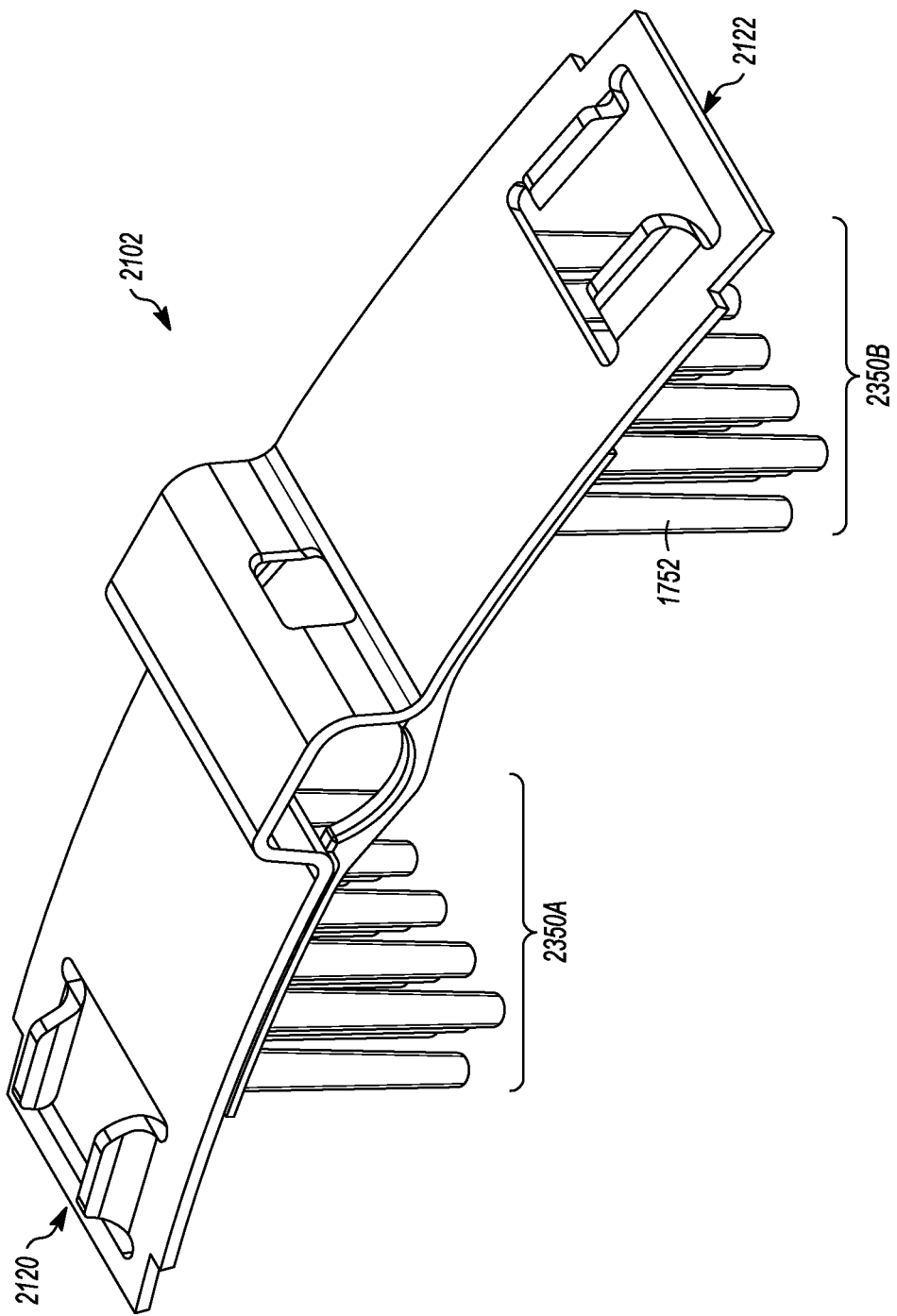
FIG. 24 illustrates a perspective view of the back plate of the brake system shown in FIG. 21.
Figure 25:
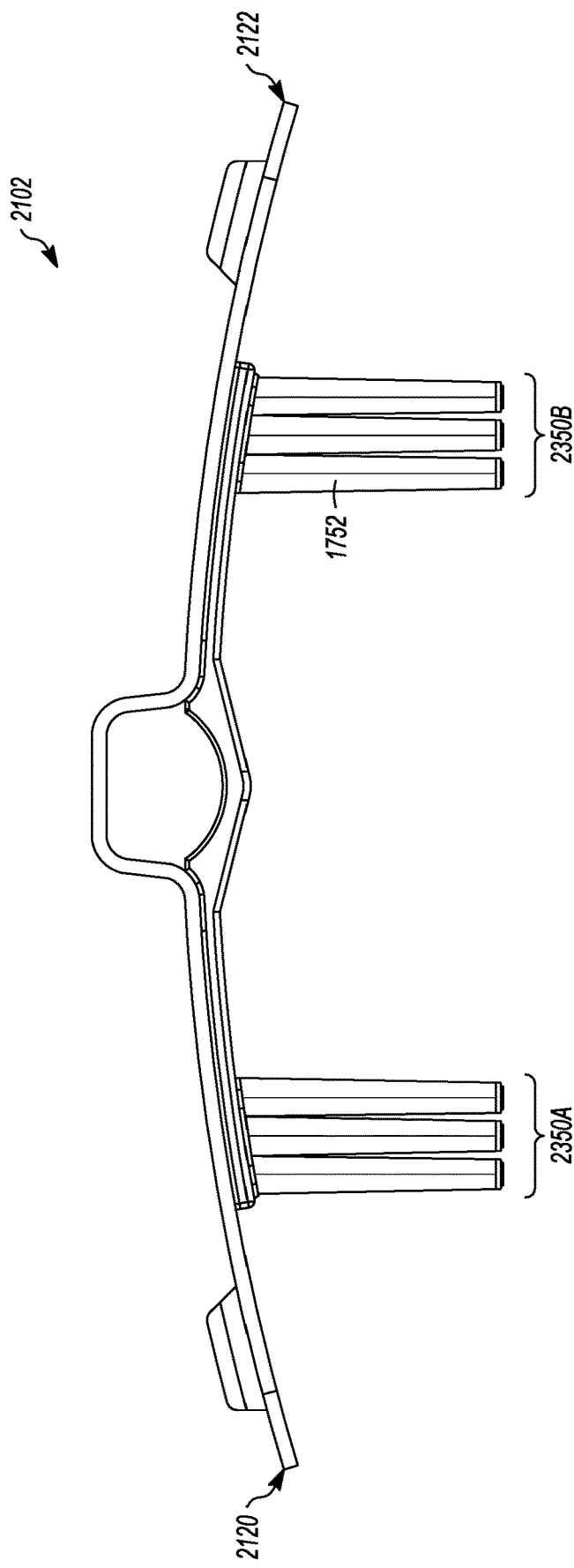
FIG. 25 illustrates a side elevational view of the back plate shown in FIG. 24.
Figure 26:
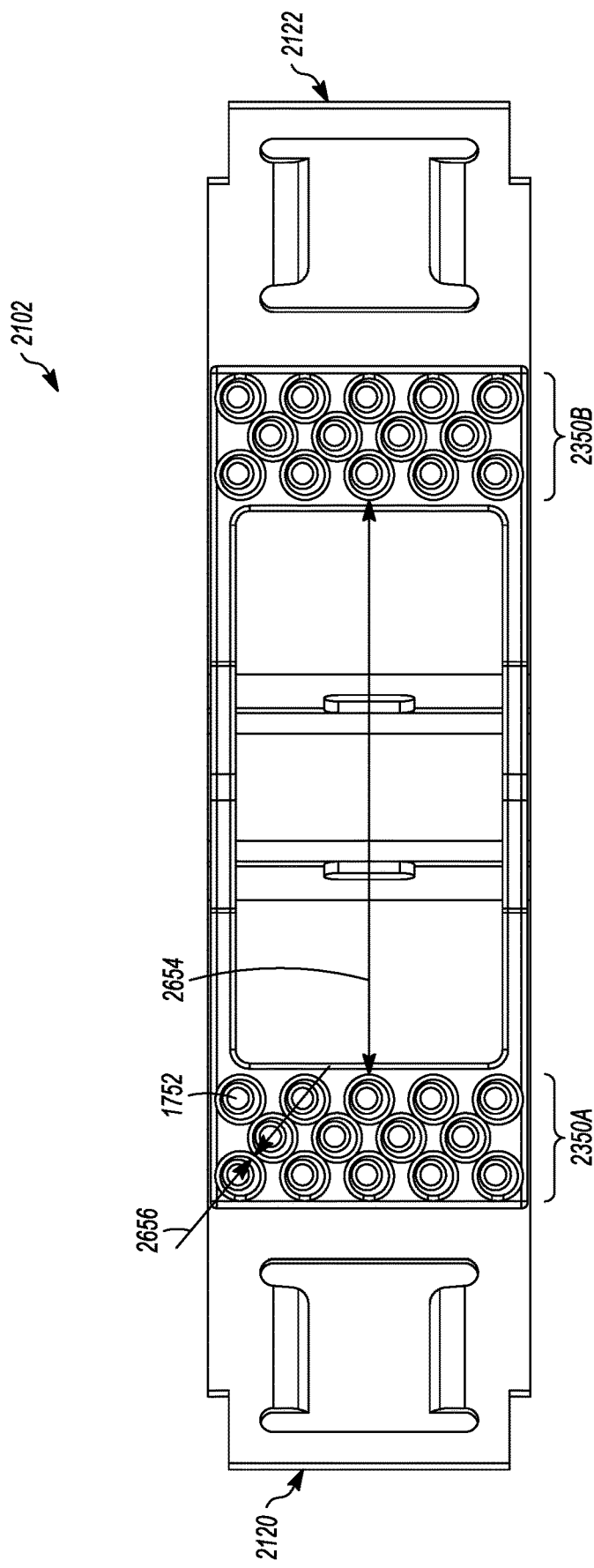
FIG. 26 illustrates a bottom plan view of the back plate shown in FIG. 24.

FIGS. 21 through 26 illustrate another example of a brake system 2100 having a back plate 2102 with multiple arrays 2350 (e.g., arrays 2350A, 2350B) of the conditioning insert pins 1752. FIG. 21 illustrates a perspective view of the brake system, FIG. 22 illustrates a side elevational view of the brake system shown in FIG. 21, FIG. 23 illustrates a bottom plan view of the brake system shown in FIG. 21, FIG. 24 illustrates a perspective view of the back plate of the brake system shown in FIG. 21, FIG. 25 illustrates a side elevational view of the back plate shown in FIG. 24, and FIG. 26 illustrates a bottom plan view of the back plate shown in FIG. 24. The brake system shown in FIGS. 21 through 26 can be similar to the brake systems shown and/or described herein, except for the conditioning inserts and brake pad. For example, the components of the brake systems shown in FIGS. 1 through 12 and 16 through 23 may be the same except for the inserts and the shape of the brake pad. The brake pad may be formed from the same material as the other brake pads shown and/or described herein.

As shown in FIGS. 23 through 26, the conditioning insert of the back plate is formed by multiple arrays of the elongated conditioning insert pins. In contrast to the back plate shown in FIGS. 16 through 20 which has a single array of insert pins, the back plate shown in FIGS. 23 through 26 includes multiple, spaced apart arrays of the elongated insert pins. The arrays are spaced apart in that a closest distance 2654 between the two arrays is farther than a closest distance 2656 between pins within either of the arrays (shown in FIG. 26). Each of the arrays is shown in FIG. 26 as including two rows of five pins separated from each other by a middle row of four pins. Alternatively, each of the arrays can have a single row, two rows, or more than three rows of pins.

Additionally, the number of pins in any of the rows may be changed from what is shown. The arrays can each have the same number of rows and/or pins, or one array may have a different number of rows and/or pins than the other array.

Each of the arrays is closer to one end 2120 of the back plate than the opposite end 2122 of the back plate. For example, the array 2150A is closer to the end 2120 of the back plate than the array 2150B, and the array 2150B is closer to the end 2122 of the back plate than the array 2150A. While only two arrays are shown in FIGS. 21 through 23, alternatively, the back plate may have three or more arrays. For example, a centrally located array also may be included that located between and spaced apart from the outer arrays shown in FIGS. 21 through 26.

The brake pad or shoe 2106 includes a centrally located airgap 2160 in the illustrated example, as shown in FIGS. 24 and 25. The brake pads shown in FIGS. 1-3, 7-9, and 16-17 continuously extend from one end of the back plates in those Figures to the opposite end of the back plates. The brake pads in those Figures continuously extend without open volumes (e.g., gaps, holes, etc., that are not caused by air bubbles formed during molding or that are not larger than one centimeter at the largest dimension of the air bubbles). While the brake pads may extend around the conditioning inserts, the brake pads otherwise continuously extend from one back plate end to the other back plate end.

In contrast, the brake pad shown in FIGS. 24 and 25 includes an open volume forming the airgap. This open volume has an inverted arcuate shape, but alternatively may have another shape. While only one airgap is shown, the brake pad can include several airgaps. The airgap can provide for stress relief within the brake pad. For example, the airgap can allow for the brake pad to adapt to changing wheel surfaces, which can occur as the inserts contact foreign objects on the wheel surfaces. The airgap can allow for the brake pad to flex more easily when these objects are encountered when compared to brake pads that do not have the airgap. This can reduce cracking or other damage to the brake pad that otherwise can be caused by stresses imparted on the brake pad by the foreign objects.

The brake pad also includes wear indicator edges 2168 (shown in FIG. 21). Alternatively, the brake pad may include only a single wear indicator edge or may have more than two wear indicator edges. Each wear indicator edge can be a chamfered edge that is angled to slope away from the nearest end of the back plate. The wear indicator edges intersect outer end surfaces 2170 of the brake pad. The end surfaces can be oriented at transverse, non-orthogonal angles that are different than the angles at which the wear indicator edges are oriented to define an interface 2172 between the wear indicator edges and the end surfaces. These wear indicator edges can provide a visual indication to an operator of the state or condition of the brake pad. For example, the brake pad and inserts gradually wear down such that the inserts and brake pad become thinner with increased used. When the brake pad is worn down to the interface between a wear indicator edge and an end surface of the brake pad, the operator can visually determine that the brake pad has significantly worn down and may be ready for replacement. The brake system can then be disassembled or removed, with another back plate and brake pad inserted for further operation.

Figure 27:
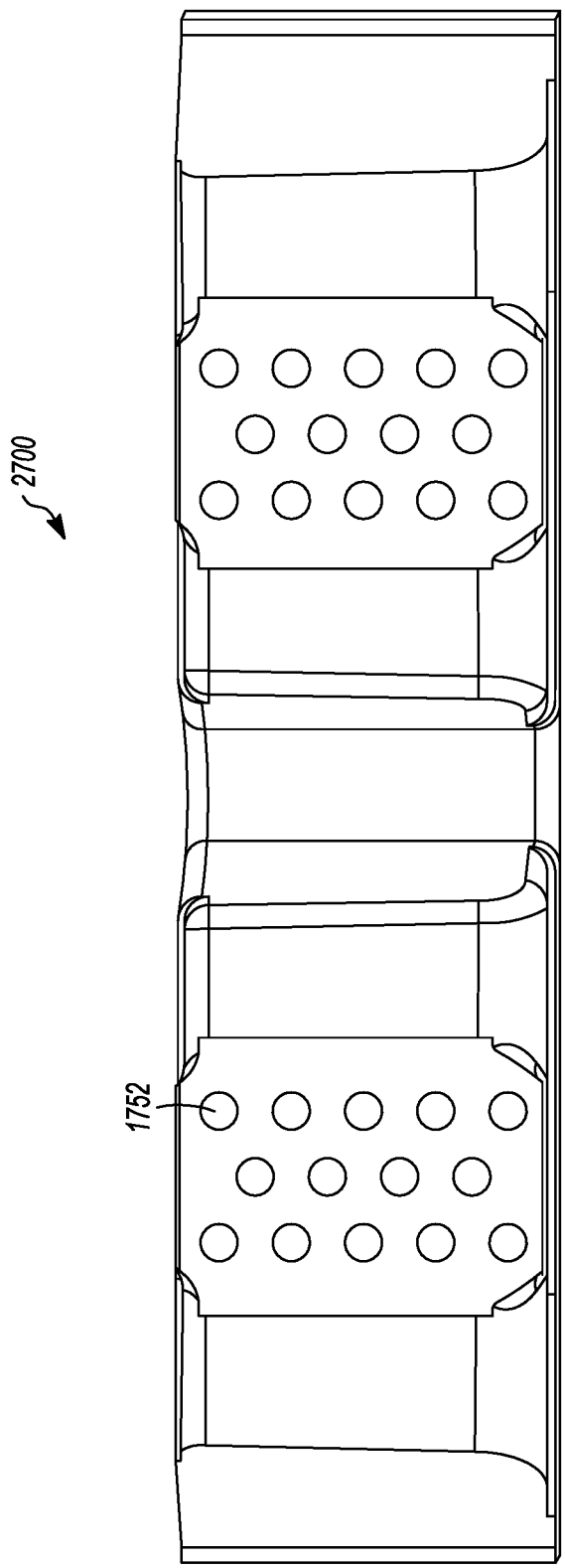
FIG. 27 illustrates a bottom plan view of the brake system.
Figure 28:
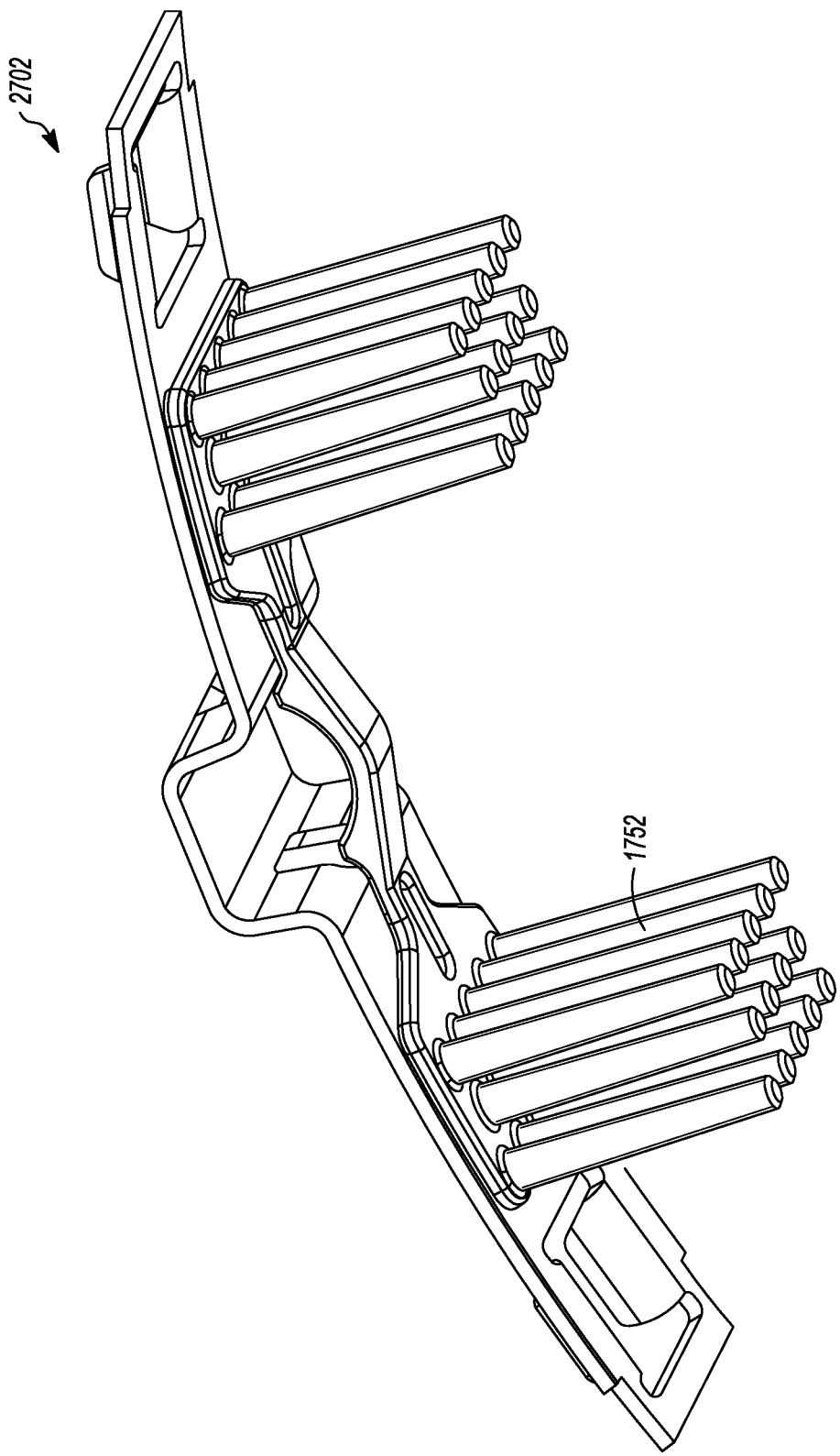
FIG. 28 illustrates a perspective view of a back plate of the brake system shown in FIG. 27.
Figure 29:
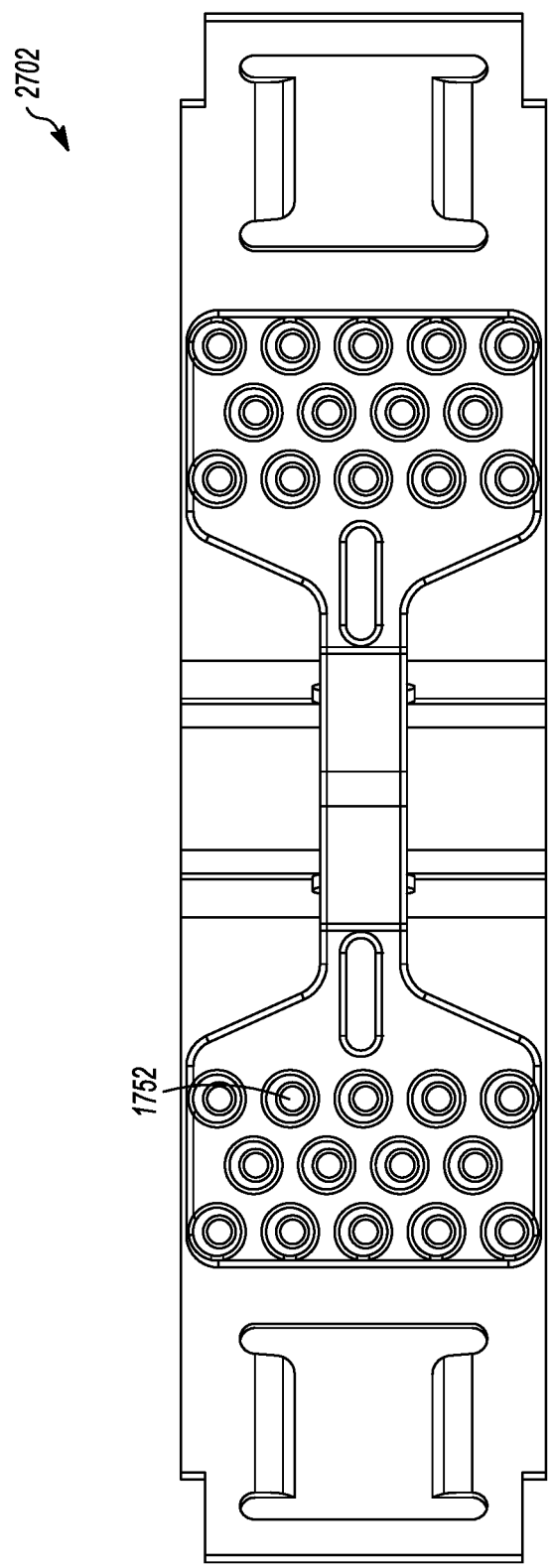
FIG. 29 illustrates a bottom plan view of the back plate shown in FIG. 28.

FIGS. 27 through 29 illustrate another example of a brake system 2700. FIG. 27 illustrates a bottom plan view of the brake system 2700, FIG. 28 illustrates a perspective view of a back plate 2702 of the brake system shown in FIG. 27, and FIG. 29 illustrates a bottom plan view of the back plate shown in FIG. 28. The brake system shown in FIGS. 27 through 29 may be similar or identical to the brake system shown in FIGS. 21 through 26 but for the intra-pin spacing between the insert pins. As shown in a comparison of FIGS. 23 and 27, the insert pins 1752 in the brake system 2700 are spaced apart farther from each other (due to the intra-pin spacing being larger) than the insert pins 1752 in the brake system 2100.

Figure 30:
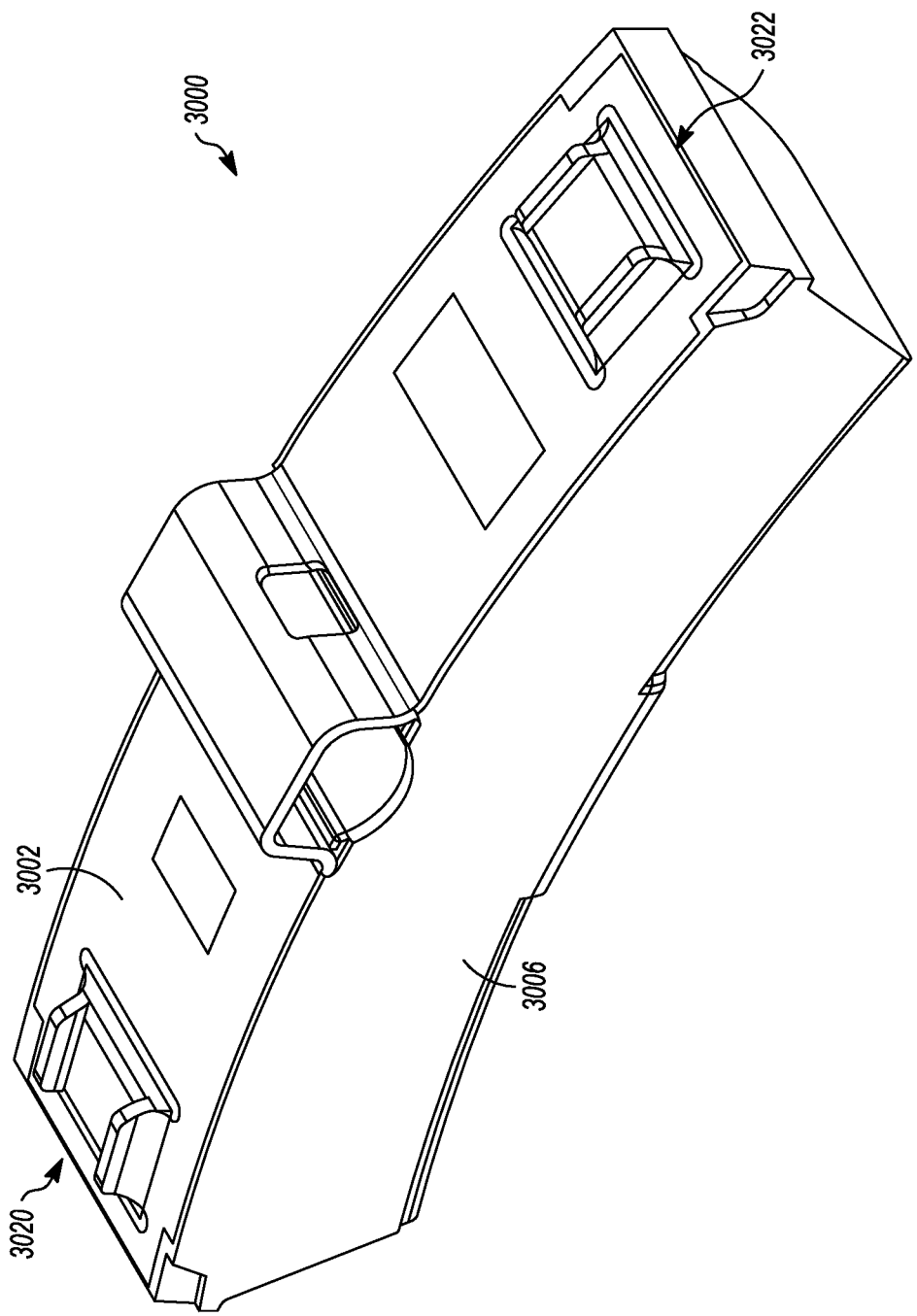
FIG. 30 illustrates a perspective view of the brake system.
Figure 31:
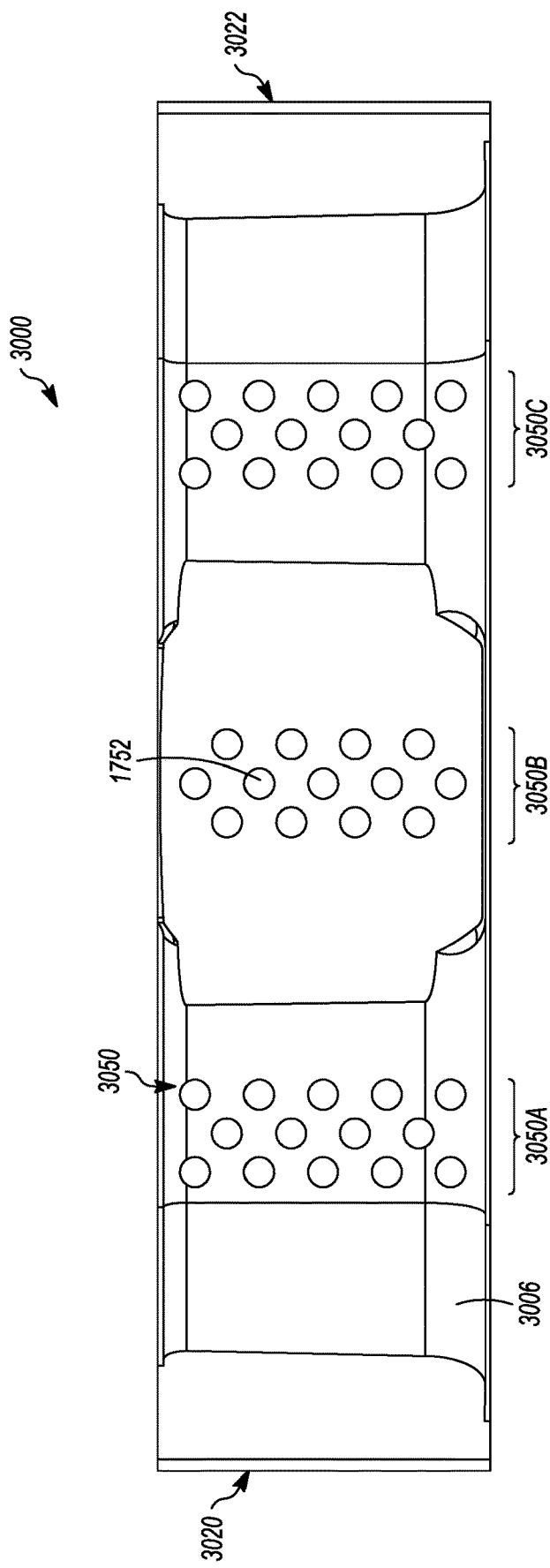
FIG. 31 illustrates a bottom plan view of the brake system shown in FIG. 30.
Figure 32:
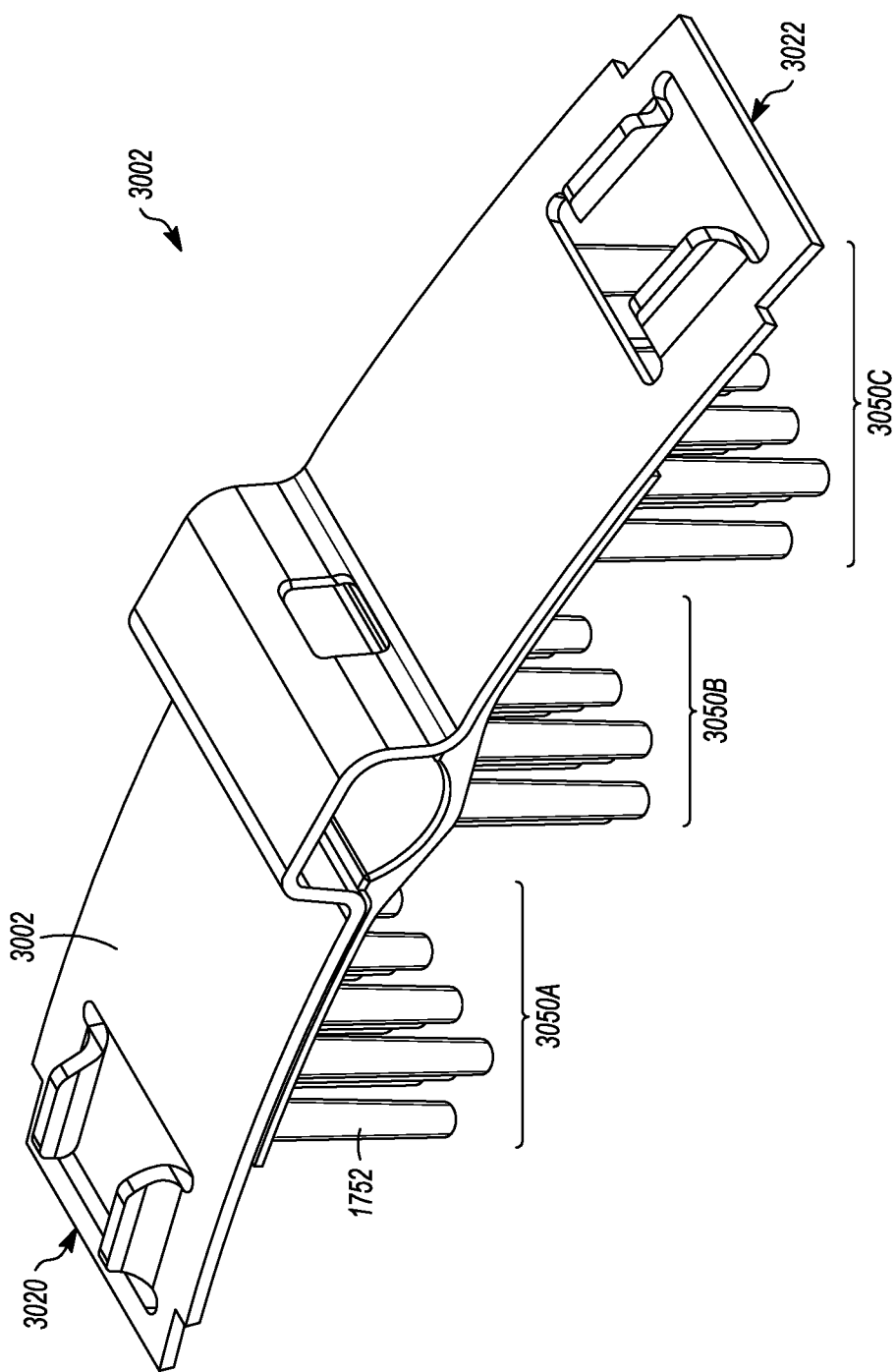
FIG. 32 illustrates a perspective view of a back plate of the brake system shown in FIG. 31.
Figure 33:
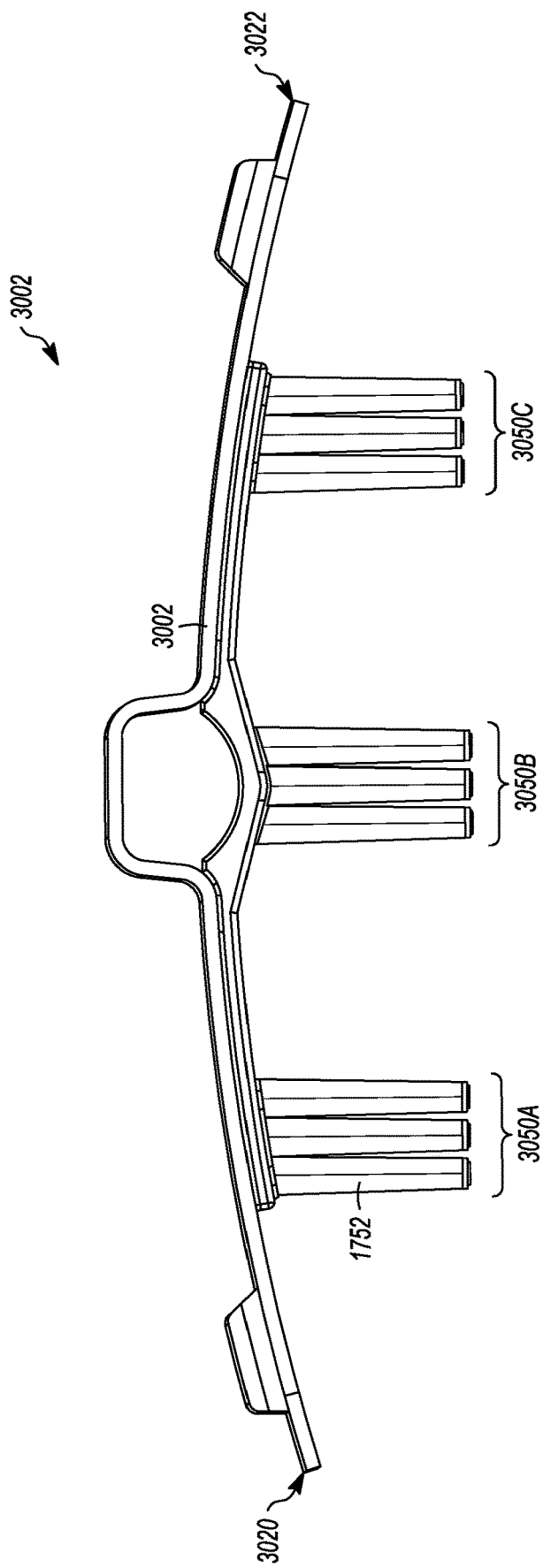
FIG. 33 illustrates a bottom plan view of the back plate shown in FIG. 32.
Figure 34:
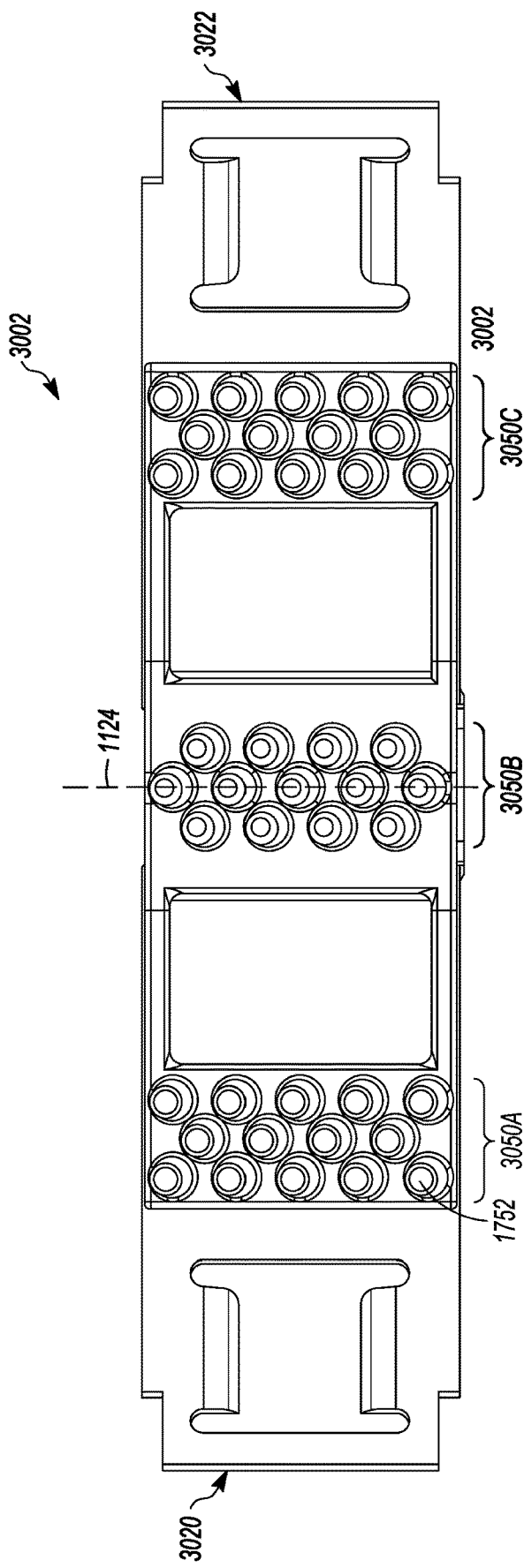
FIG. 34 illustrates a side elevational view of the back plate shown in FIG. 32.

FIGS. 30 through 34 illustrate another example of a brake system 3000. FIG. 30 illustrates a perspective view of the brake system, FIG. 31 illustrates a bottom plan view of the brake system shown in FIG. 30, FIG. 32 illustrates a perspective view of a back plate 3002 of the brake system shown in FIG. 31, FIG. 33 illustrates a bottom plan view of the back plate shown in FIG. 32, and FIG. 34 illustrates a side elevational view of the back plate shown in FIG. 32. The brake system 3000 is similar to the brake system 1600 shown in FIGS. 16 through 20 and the brake systems 2100, 2700 shown in FIGS. 21 through 29. For example, the brake system 3000 includes a back plate 3002, arrays 3050 (e.g., arrays 3050A-C) of conditioning insert pins 1752, and a brake pad 3006

Figure 35:
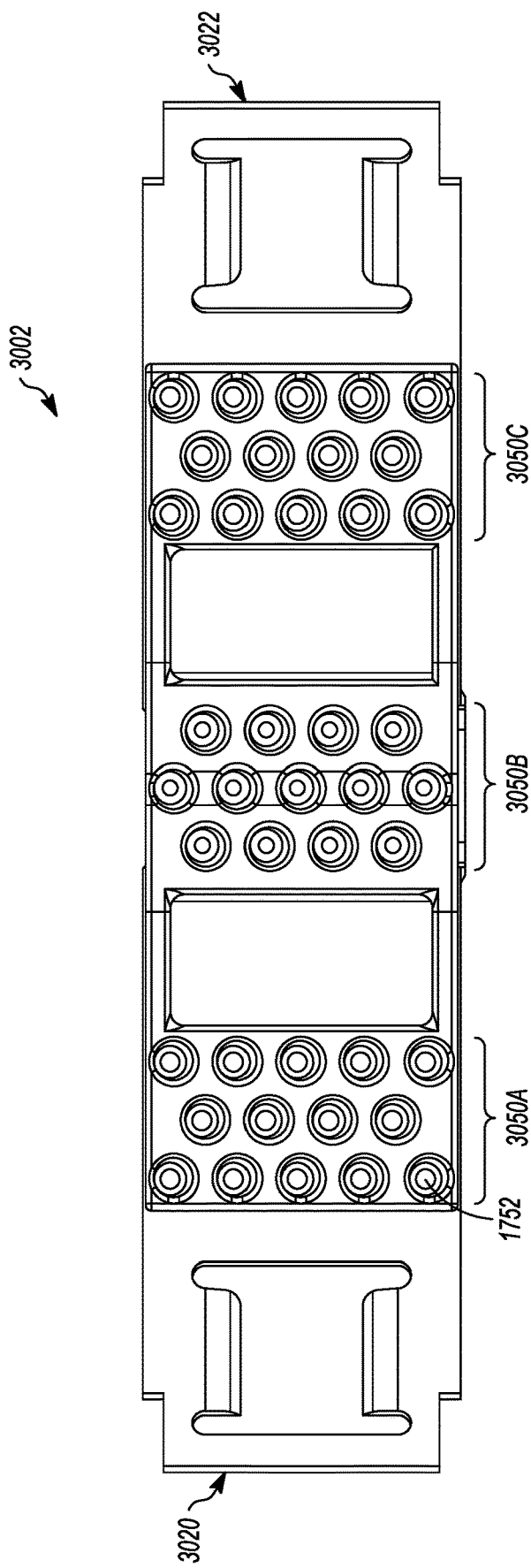
FIG. 35 illustrates another embodiment of the back plate of the brake system shown in FIG. 30.

One difference between the brake systems 1600, 2100, 2700, 3000 is that the brake system 3000 includes a centrally located array 3050B of the pins 1752 and outer arrays 3050A, 3050C of the pins 1752. The outer arrays 3050A, 3050C may be located closer to outer ends 3020, 3022 of the back plate 3002, while the centrally located array 3050B may be centered over the middle 1124 of the back plate 3002. For example, the array 3050A may be closer to the end 3020 than the arrays 3050B, 3050C, the array 3050C may be closer to the end 3022 than the arrays 3050A, 3050B, and the array 3050B may be midway between the arrays 3050A, 3050C. FIG. 35 illustrates another embodiment of the back plate 3002 of the brake system 3000, where the pins 1752 in each array 3050 are spaced apart farther than the pins 1752 in the arrays 3050 in FIGS. 30 through 34. The intra-pin spacing may be the same for each array, or may be different in different arrays. For example, the pins in one array 3050 may be closer to each other than the pins in another array 3050 in the same back plate.

Figure 36:
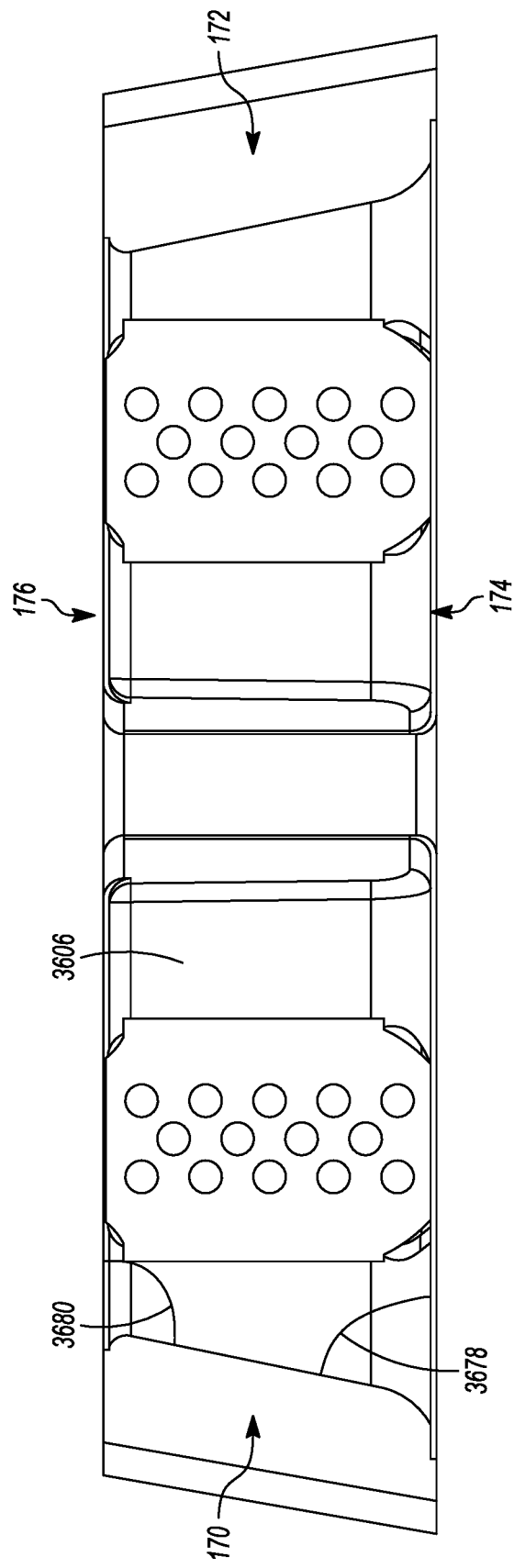
FIG. 36 illustrates another example of a brake pad that may be used in one or more of the brake systems shown and/or described herein.

FIG. 36 illustrates another example of a brake pad 3606 that may be used in one or more of the brake systems shown and/or described herein. The brake pad shown in FIG. 36 can be used with any of the brake systems shown and/or described herein. While the brake pad is shown as extending around two arrays of the conditioning insert pins, the brake pad may extend around other conditioning inserts described herein. One difference between the brake pad shown in FIG. 36 and the other brake pads is chamfered outer end surfaces 170, 172.

The outer end surfaces are chamfered in that these surfaces are oriented at transverse, but non-orthogonal, angles to the inner and outer surfaces 174, 176 of the brake pad. For example, an angle 3678 between the inner surface 174 and each of the end surfaces 170, 172 may be an acute angle while an angle 3680 between the outer surface 176 and each of the end surfaces 170, 172 may be an obtuse angle. These angled end surfaces can help deflect water and debris from the brake pad. This can improve friction and adhesion between the brake pad and the wheel surface during wet or icy conditions, and can protect the brake pad from damage caused by debris such as sand, pebbles, coal dust, mined materials, etc.

Figure 37:
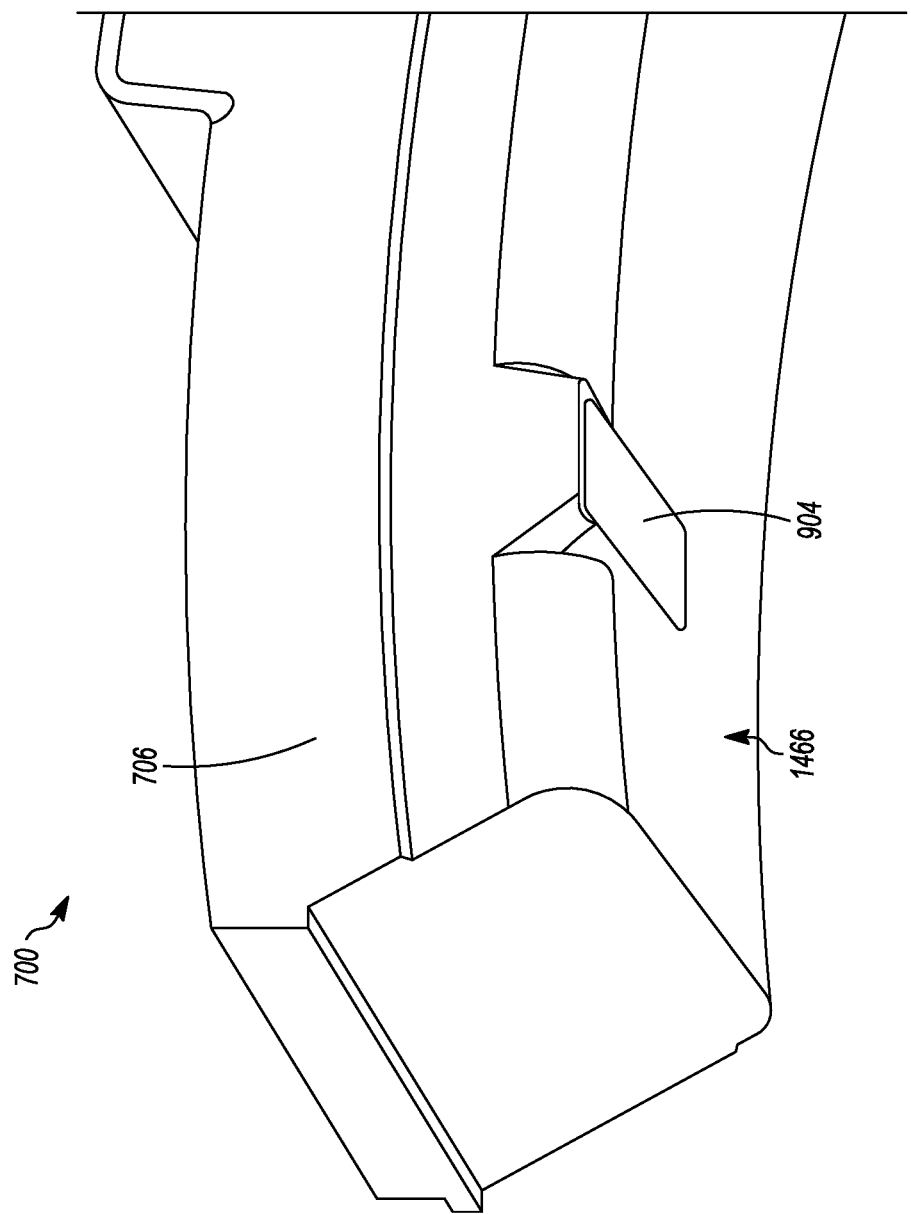
FIG. 37 illustrates a perspective view of an example of one end of the brake system shown in FIGS. 7 through 12.

FIG. 37 illustrates a perspective view of an example of one end 172 of the brake system 700 shown in FIGS. 7 through 12. As shown, the offset conditioning insert 904 may partially extend out of the working surface 1466 of the brake pad 706. The brake pad may extend around a perimeter of the bottom surface of the insert. This can assist with the molding of the brake pad (e.g., to prevent the mold from bottoming out). Excess brake pad material can be ground away or otherwise removed such that the bottom surface of the insert is flush (e.g., coplanar with) the working surface of the brake pad (even before the first use of the brake pad). This exposure of the bottom surface of the insert allows the insert to immediately begin working to condition the wheel surface on the very first use of the brake pad and insert.

The various features, aspects, or components shown and described herein may be combined into a brake system in various combinations. For example, the different inserts may be used in the same brake system, the brake pad having the airgap can be used with inserts other than the arrays of insert pins, the different radii of curvature in the brake pads can be used, etc. In one embodiment of the inventive subject matter described herein, a brake system can include at least one of the offset inserts shown in FIGS. 1 through 6, at least one of the offset inserts shown in FIGS. 7-12, the larger radius of curvature in the brake pad shown in FIG. 14, and/or one or more of the arrays of pin inserts.

The conditioning inserts shown and described herein also may be positioned at the outer ends of the brake pad. For example, instead of the end 170 or 172 of the brake pad facing ahead of the vehicle along a direction of movement of the vehicle, one or more of the conditioning inserts shown and/or described herein may be positioned outside of the end 170 or 172. Because the inserts are more rigid than the brake pads, placing the insert(s) at the outer ends 170, 172 can protect the brake pads from damage otherwise caused by debris.

A method for forming one or more of the brake systems described herein can include (at a first step) forming a back plate that may support a composite brake pad. This back plate can be formed to include one or more of the conditioning inserts shown and/or described herein. The back plate can be formed by casting the shape of the back plate from iron, an iron alloy, cast iron, ductile cast iron, malleable cast iron, gray cast iron, another metal or metal alloy, a composite material, or the like, and then shaving or otherwise grinding off excess material from the casting. The method also can include (at a subsequent second step) forming the composite brake pad in contact with the back plate and at least partially around the composite insert(s). The brake pad can be formed by placing the back plate with conditioning insert(s) into a mold and pouring the material forming the brake pad in the mold. This material can flow around the conditioning inserts and cure (or otherwise solidify) to form bonds with the back plate and/or conditioning inserts. Portions of the brake pad can be ground away or otherwise removed at a third step to expose bottom surfaces of the inserts. At a fourth step, the back plate can then be coupled with a brake head for use of the brake pad and conditioning insert(s) in braking and conditioning a surface of a wheel, as described herein.

In one example, a vehicle brake system includes a back plate that may support a composite pad, and at least one conditioning insert coupled to the back plate and that may contact a surface of a wheel during a braking event and thereby to condition at least a portion of the surface of the wheel.

The back plate can define a U-shaped coupler that is centrally located and has two ends that are distal from the coupler, and the at least one conditioning insert can be disposed proximate to one of the two ends of the back plate.

The back plate can define a U-shaped coupler that is centrally located and has two ends that are distal from the coupler, and the at least one conditioning insert can include a plurality of conditioning inserts with each of the conditioning inserts disposed proximate to one of the two ends of the back plate. The back plate can include abutment portions that are disposed proximate to the ends of the back plate and that are configured to engage a brake head, and the at least one conditioning insert can be disposed between the abutment portions along a length of the back plate.

The back plate can include abutment portions that are disposed proximate to the ends of the back plate and that are configured to engage a brake head, and the at least one conditioning insert can be disposed opposite at least one of the abutment portions. The back plate can define a U-shaped coupler that is centrally located and has two ends that are distal from the coupler. The back plate can have a centerline extending from a first end of the ends to a second end of the ends while passing through a center of the back plate, and the at least one conditioning insert can be disposed off of the centerline so as to not be centrally disposed. The at least one conditioning insert can include plural conditioning inserts disposed off of the centerline. A first conditioning insert of the conditioning inserts can be disposed on one side of the centerline and a second conditioning insert of the conditioning inserts is disposed on an opposite side of the centerline.

The brake system can include the composite pad coupled with the back plate and at least partially enclosing the at least one conditioning insert. The composite pad may engage the surface of the wheel during the braking event to slow or stop rotation of the wheel. An outer end of the at least one conditioning insert can be exposed and not enclosed within the composite pad. The composite pad can have a larger radius of curvature on a first side of the composite pad that faces a flange of the wheel than on an opposite, second side of the composite pad that faces away from the flange of the wheel.

In one example, a vehicle brake system includes a back plate configured to support a composite pad, the back plate elongated from a first end to a second end, and conditioning inserts coupled to the back plate proximate to the first and second ends of the back plate. The conditioning inserts are configured to contact a surface of a wheel during a braking event and thereby to condition at least a portion of the surface of the wheel.

The back plate can include abutment portions that are disposed proximate to the first and second ends of the back plate and that may engage a brake head, and the first and second conditioning inserts can be disposed between the abutment portions. The back plate can include abutment portions that are disposed proximate to the first and second ends of the back plate and that may engage a brake head, and the first and second conditioning inserts can be disposed opposite the abutment portions. The back plate can have a centerline extending from the first end to the second end while passing through a center of the back plate, and at least one of the first conditioning insert or the second conditioning insert can be disposed off of the centerline so as to not be centrally disposed. The back plate can include opposite first and second edges that each extend from the first end to the second end with the centerline midway between the first and second edges, and the first conditioning insert can be between the first edge and the centerline and the second conditioning insert is between the second edge and the centerline.

The brake system can include the composite pad, where the composite pad has a larger radius of curvature on a first side of the composite pad that faces a flange of the wheel than on an opposite, second side of the composite pad that faces away from the flange of the wheel.

In one example, a method includes (at a first step) obtaining a back plate configured to support a composite pad, and (at a second step) forming at least one conditioning insert coupled to the back plate and positioned to contact a surface of a wheel during a braking event and thereby to condition at least a portion of the surface of the wheel. The back plate can be formed to have a U-shaped coupler that is centrally located and two ends that are distal from the coupler, and the at least one conditioning insert can be formed proximate to one of the two ends of the back plate.

The at least one conditioning insert can be formed as a plurality of conditioning inserts with each of the conditioning inserts disposed proximate to one of the two ends of the back plate. The back plate can be formed to have a centerline extending from a first end of the ends to a second end of the ends while passing through a center of the back plate, and the at least one conditioning insert can be formed in a location off of the centerline so as to not be centrally disposed. The at least one conditioning insert can be formed as first and second conditioning inserts with the first conditioning insert disposed on one side of the centerline and the second conditioning insert on an opposite side of the centerline.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle brake system, comprising:
   a back plate configured to support a composite pad; and
   at least two conditioning inserts coupled to the back plate and configured to contact a surface of a wheel during a braking event and thereby to condition at least a portion of the surface of the wheel;
   wherein the back plate defines a U-shaped coupler that is centrally located and has two ends that are distal from the coupler, the back plate having a centerline extending from a first end of the two ends to a second end of the two ends while passing through a center of the back plate, and the at least two conditioning inserts are disposed off of the centerline so as to not be centrally disposed.

2. The vehicle brake system of claim 1, wherein each of the conditioning inserts of the at least two conditioning inserts is disposed proximate to one of the two ends of the back plate.

3. The vehicle brake system of claim 2, wherein the back plate includes abutment portions that are disposed proximate to the ends of the back plate and that are configured to engage a brake head, and wherein the at least two conditioning inserts are disposed between the abutment portions along a length of the back plate.

4. The vehicle brake system of claim 2, wherein the back plate includes abutment portions that are disposed proximate to the ends of the back plate and that are configured to engage a brake head, and wherein each of the at least one conditioning inserts is disposed opposite at least one of the abutment portions.

5. The vehicle brake system of claim 1, wherein a first conditioning insert of the at least two conditioning inserts is disposed on one side of the centerline and a second conditioning insert of the at least two conditioning inserts is disposed on an opposite side of the centerline.

6. The vehicle brake system of claim 1, wherein the at least two conditioning inserts are located on a same side of the centerline.

7. The vehicle brake system of claim 1, further comprising:
the composite pad coupled with the back plate and at least partially enclosing the at least two conditioning inserts, the composite pad configured to engage the surface of the wheel during the braking event to slow or stop rotation of the wheel, wherein outer ends of the at least two conditioning inserts are exposed and not enclosed within the composite pad.

8. The vehicle brake system of claim 1, wherein the composite pad has a larger radius of curvature on a first side of the composite pad that faces a flange of the wheel than on an opposite, second side of the composite pad that faces away from the flange of the wheel.

9. The vehicle brake system of claim 1, wherein the at least two conditioning inserts include an array of elongated pins.

10. A vehicle brake system, comprising:
a back plate configured to support a composite pad, the back plate elongated from a first end to a second end; and
conditioning inserts coupled to the back plate proximate to the first and second ends of the back plate, the conditioning inserts configured to contact a surface of a wheel during a braking event and thereby to condition at least a portion of the surface of the wheel;
wherein the back plate has a centerline extending from the first end to the second end while passing through a center of the back plate, and at least one of a first conditioning insert or a second conditioning insert is disposed off of the centerline so as to not be centrally disposed.

11. The vehicle brake system of claim 10, wherein the back plate includes abutment portions that are disposed proximate to the first and second ends of the back plate and that are configured to engage a brake head, and wherein the first and second conditioning inserts are disposed between the abutment portions.

12. The vehicle brake system of claim 10, wherein the back plate includes abutment portions that are disposed proximate to the first and second ends of the back plate and that are configured to engage a brake head, and wherein the first and second conditioning inserts are disposed opposite the abutment portions.

13. The vehicle brake system of claim 10, wherein the back plate includes opposite first and second edges that each extend from the first end to the second end with the centerline midway between the first and second edges, and wherein the first conditioning insert is between the first edge and the centerline and the second conditioning insert is between the second edge and the centerline.

14. The vehicle brake system of claim 10, further comprising the composite pad, wherein the composite pad has a larger radius of curvature on a first side of the composite pad that faces a flange of the wheel than on an opposite, second side of the composite pad that faces away from the flange of the wheel.

15. A method comprising:
obtaining a back plate configured to support a composite pad; and
forming at least one conditioning insert coupled to the back plate and positioned to contact a surface of a wheel during a braking event and thereby to condition at least a portion of the surface of the wheel
wherein the back plate is formed to have a U-shaped coupler that is centrally located and two ends that are distal from the coupler, and the at least one conditioning insert is formed proximate to one of the two ends of the back plate; and
wherein the back plate is formed to have a centerline extending from a first end of the two ends to a second end of the two ends while passing through a center of the back plate, and the at least one conditioning insert is formed in a location off of the centerline so as to not be centrally disposed.

16. The method of claim 15, wherein the at least one conditioning insert is formed as a plurality of conditioning inserts with each of the conditioning inserts disposed proximate to one of the two ends of the back plate.

17. The method of claim 15, wherein the at least one conditioning insert is formed as first and second conditioning inserts with the first conditioning insert disposed on one side of the centerline and the second conditioning insert on an opposite side of the centerline.

* * * * *